US010821976B2

(12) United States Patent
Devi

(10) Patent No.: US 10,821,976 B2
(45) Date of Patent: Nov. 3, 2020

(54) NAVIGATION SYSTEM WITH DYNAMIC SPEED SETTING MECHANISM AND METHOD OF OPERATION THEREOF

(71) Applicant: Telenav, Inc., Santa Clara, CA (US)

(72) Inventor: Sarvesh Bansilal Devi, Milpitas, CA (US)

(73) Assignee: Telenav, Inc., Santa Clara, CA (US)

(*) Notice: Subject to any disclaimer, the term of this patent is extended or adjusted under 35 U.S.C. 154(b) by 13 days.

(21) Appl. No.: 15/419,688

(22) Filed: Jan. 30, 2017

(65) Prior Publication Data
US 2018/0215380 A1 Aug. 2, 2018

(51) Int. Cl.
B60W 30/14 (2006.01)
B60W 30/16 (2020.01)
B60W 40/04 (2006.01)
G01C 21/36 (2006.01)
H04L 29/08 (2006.01)
G01C 21/34 (2006.01)

(52) U.S. Cl.
CPC ........ B60W 30/143 (2013.01); B60W 30/162 (2013.01); B60W 40/04 (2013.01); G01C 21/3492 (2013.01); G01C 21/3658 (2013.01); H04L 67/18 (2013.01); H04L 67/12 (2013.01)

(58) Field of Classification Search
None
See application file for complete search history.

(56) References Cited

U.S. PATENT DOCUMENTS

| 9,734,714 B1* | 8/2017 | Fan ................. G08G 1/096716 |
| 2009/0222170 A1* | 9/2009 | Scherl ................. B62D 15/025 701/44 |
| 2011/0196608 A1* | 8/2011 | Jansen ..................... G08G 1/22 701/2 |
| 2012/0004835 A1* | 1/2012 | Sato ..................... G08G 1/0104 701/118 |
| 2013/0082874 A1* | 4/2013 | Zhang .................. G01S 5/0072 342/357.31 |
| 2013/0275033 A1* | 10/2013 | Bastiaensen .......... G01C 21/26 701/119 |
| 2014/0107867 A1* | 4/2014 | Yamashiro ............... G08G 1/22 701/2 |
| 2014/0188376 A1* | 7/2014 | Gordon .................... G08G 1/09 701/118 |
| 2015/0300834 A1* | 10/2015 | Shin ................... G01C 21/3602 701/523 |
| 2016/0363935 A1* | 12/2016 | Shuster ..................... B60L 7/10 |

* cited by examiner

Primary Examiner — Todd Melton
Assistant Examiner — Jason R Roberson
(74) Attorney, Agent, or Firm — Perspectives Law Group, Corp.

(57) ABSTRACT

A navigation system includes: a control circuit configured to calculate a current location for representing a control vehicle traveling in a traffic lane, calculate a travel-lane identification for identifying the traffic lane, generate a vehicle movement control based on the travel-lane identification for controlling a physical operation or function of the control vehicle; and a vehicle storage circuit, coupled to the control circuit, configured to store the vehicle movement control.

19 Claims, 8 Drawing Sheets

NAVIGATION SYSTEM WITH DYNAMIC SPEED SETTING MECHANISM AND METHOD OF OPERATION THEREOF

TECHNICAL FIELD

An embodiment of the present invention relates generally to a navigation system, and more particularly to a system with a dynamic speed setting mechanism.

BACKGROUND ART

Modern consumer and industrial electronics, especially devices such as graphical computing systems, televisions, projectors, cellular phones, portable digital assistants, and combination devices, are providing increasing levels of functionality to support modern life including location-based information services. Research and development in the existing technologies can take a myriad of different directions.

As users become more empowered with the growth of mobile communication technology, new and old paradigms begin to take advantage of this new space. One such space is navigation functions for devices. However, in the midst of increase in information readily available to the user, utilizing externally sourced information to provide unintended features for users has yet been fully utilized.

Thus, a need still remains for a navigation system with a dynamic speed setting mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

An embodiment of the present invention provides a method of operation of a navigation system including: a control circuit configured to calculate a current location for representing a control vehicle traveling in a traffic lane, calculate a travel-lane identification for identifying the traffic lane, generate a vehicle movement control based on the travel-lane identification for controlling a physical operation or function of the control vehicle; and a storage circuit, coupled to the control circuit, configured to store the vehicle movement control.

An embodiment of the present invention provides a navigation system, including: a control circuit configured to: a control circuit configured to calculate a current location for representing a control vehicle traveling in a traffic lane, calculate a travel-lane identification for identifying the traffic lane, generate a vehicle movement control based on the travel-lane identification for controlling a physical operation or function of the control vehicle; and a storage circuit, coupled to the control circuit, configured to store the vehicle movement control.

An embodiment of the present invention provides a non-transitory computer readable medium including instructions for a navigation system, including: a control circuit configured to calculate a current location for representing a control vehicle traveling in a traffic lane, calculate a travel-lane identification for identifying the traffic lane, generate a vehicle movement control based on the travel-lane identification for controlling a physical operation or function of the control vehicle; and a storage circuit, coupled to the control circuit, configured to store the vehicle movement control.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
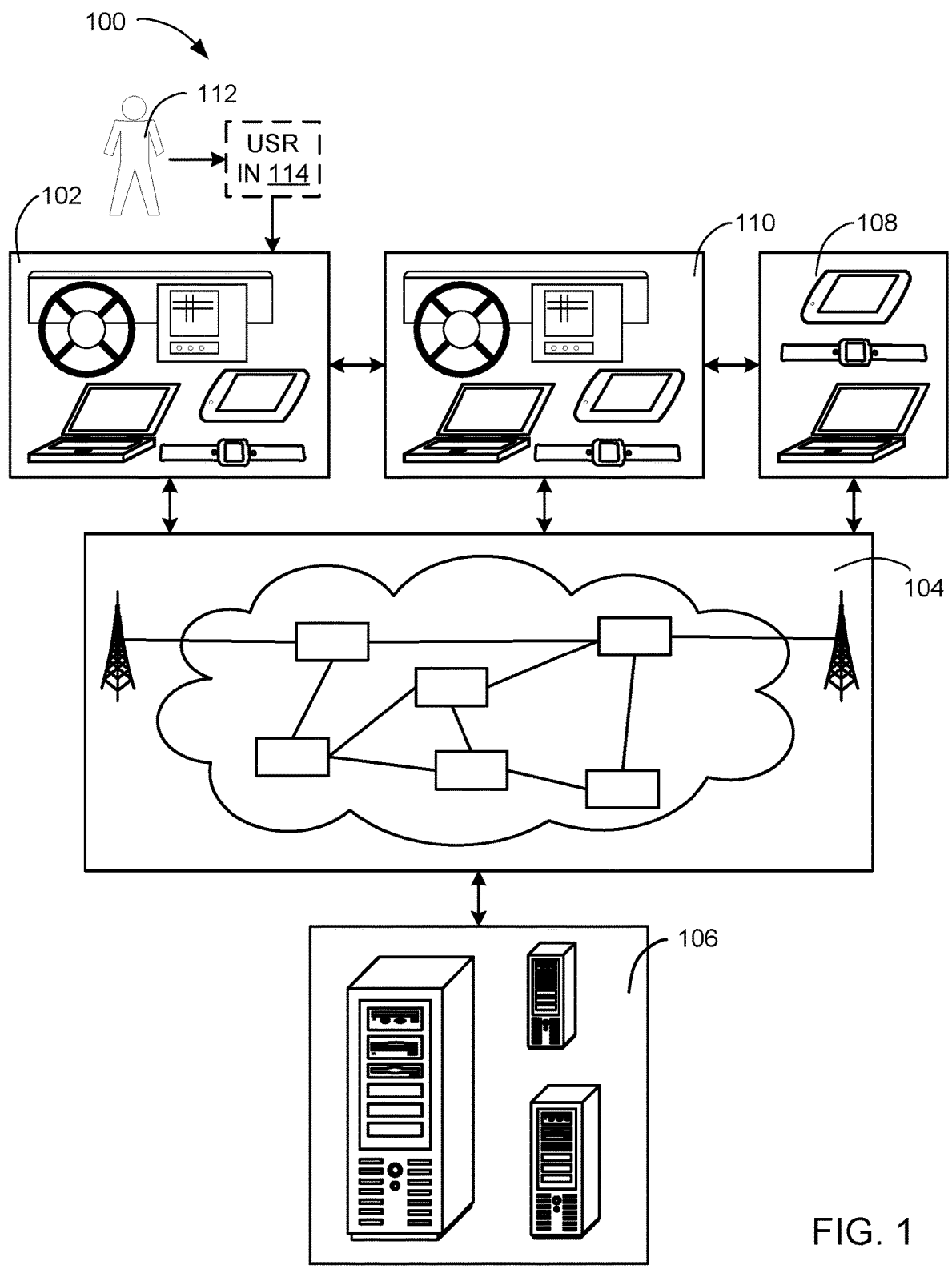
FIG. 1 is a navigation system with a dynamic speed setting mechanism in an embodiment of the present invention.

The following embodiments can provide vehicle movement control for operating or controlling physical movement of a vehicle. The vehicle movement control can be based on a travel-lane identification along with a current location, and can include a control vehicle speed for providing a lane-specific cruise control feature for the vehicle.

The vehicle movement control can further be based on an area profile corresponding to a real-time state or status of a geographic area, including representations, locations, statuses, or a combination thereof of one or more vehicles in the geographic area. The area profile can be based on vehicle data for representing status of a reporting vehicle or device, the vehicle data for representing sensor data associated with an environment or a surrounding of the reporting vehicle or the device, or a combination thereof.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

One skilled in the art would appreciate that the format with which navigation information is expressed is not critical to some embodiments of the invention. For example, in some embodiments, navigation information is presented in the format of (X, Y); where X and Y are two coordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein can include the navigation information described as well as information relating to points of interest to the user, such as local business, hours of businesses, types of businesses, advertised specials, traffic information, maps, local events, and location based community or personal information.

The term "module" referred to herein can include or be implemented as or include software, hardware, or a combination thereof in the present invention in accordance with the context in which the term is used. For example, the software can be machine code, firmware, embedded code, and application software. The software can also include a function, a call to a function, a code block, or a combination thereof. Also for example, the hardware can be gates, circuitry, processor, computer, integrated circuit, integrated circuit cores, a pressure sensor, an inertial sensor, a microelectromechanical system (MEMS), passive devices, physical non-transitory memory medium including instructions for performing the software function, a portion therein, or a combination thereof to control one or more of the hardware units or circuits.

Referring now to FIG. 1, therein is shown a navigation system 100 with a dynamic speed setting mechanism in an embodiment of the present invention. The navigation system 100 can include a first device 102, such as a client or a server, connected to a second device 106, such as a client or server.

The navigation system 100 can include a system for searching or providing guidance or information associated with geographic locations, speed control, a regulatory system for enabling access to a device or a vehicle, or a combination thereof. The first device 102 can communicate with the second device 106 with a network 104, such as a wireless or wired network.

For example, the first device 102 can be of any of a variety of computing devices, such as a cellular phone, personal digital assistant, a notebook computer, a wearable device, internet of things (IoT) device, automotive telematics navigation system, or other multi-functional device. Also for example, the first device 102 can include a device or a sub-system, an autonomous or self-maneuvering vehicle or object, a remote-controlled vehicle or object, or a combination thereof.

The first device 102 can couple, either directly or indirectly, to the network 104 to communicate with the second device 106 or can be a stand-alone device. The first device 102 can further be separate form or incorporated with a vehicle, such as a car, truck, bus, or train.

For illustrative purposes, the navigation system 100 is described with the first device 102 as a mobile computing device, although it is understood that the first device 102 can be different types of devices. For example, the first device 102 can also be a non-mobile computing device, such as a server, a server farm, or a desktop computer.

The second device 106 can be any of a variety of centralized or decentralized computing devices, or video transmission devices. For example, the second device 106 can be a computer, grid computing resources, a virtualized computer resource, cloud computing resource, routers, switches, peer-to-peer distributed computing devices, or a combination thereof.

The second device 106 can be centralized in a single room, distributed across different rooms, distributed across different geographical locations, embedded within a telecommunications network. The second device 106 can couple with the network 104 to communicate with the first device 102. The second device 106 can also be a client type device as described for the first device 102.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, a wearable device, or a different type of client device. The second device 106 can be a standalone device, or can be incorporated with a vehicle, such as a car, a truck, a bus, or a train.

Also for illustrative purposes, the navigation system 100 is described with the second device 106 as a computing device, although it is understood that the second device 106 can be different types of devices. Also for illustrative purposes, the navigation system 100 is shown with the second device 106 and the first device 102 as end points of the network 104, although it is understood that the navigation system 100 can include a different partition between the first device 102, the second device 106, and the network 104. For example, the first device 102, the second device 106, or a combination thereof can also function as part of the network 104.

The network 104 can span and represent a variety of networks. For example, the network 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path. Ethernet, digital subscriber line (DSL), fiber to the home (FTTH), and plain old telephone service (POTS) are examples of wired communication that can be included in the network 104. Further, the network 104 can traverse a number of network topologies and distances. For example, the network 104 can include direct connection, personal area network (PAN), local area network (LAN), metropolitan area network (MAN), wide area network (WAN), or a combination thereof.

The navigation system 100 can further include a third device 108, a fourth device 110, or a combination thereof. The third device 108, the fourth device 110, or a combination thereof can be similar to the first device 102, the second device 106, or a combination thereof.

For example, the third device 108, the fourth device 110, or a combination thereof can include an end-user device, a mobile device, a server, a base station, a maneuverable vehicle or object, a portion thereof, or a combination thereof. Also for example, the third device 108, the fourth device 110, or a combination thereof can include device or subsystem included in or integral with a vehicle, such as a computing system, an infotainment system, or a combination thereof.

As a more specific example, the third device 108, the fourth device 110, or a combination thereof can include a cellular phone, personal digital assistant, a notebook computer, a wearable device, internet of things (IoT) device, automotive telematics navigation system, or other multifunctional mobile communication or entertainment device. Also as a more specific example, the third device 108, the fourth device 110, or a combination thereof can include a computer, grid computing resources, a virtualized computer resource, cloud computing resource, routers, switches, peer-to-peer distributed computing devices, or a combination thereof.

The navigation system 100 can be used by a user 112. The user 112 can include a person or an entity accessing or utilizing the navigation system 100 or a device therein. For example, the user 112 can include a person owning or operating the first device 102, the third device 108, the fourth device 110, a service, or a combination thereof. Also for example, the user 112 can access or utilize the second device 106 through the first device 102, the third device 108, the fourth device 110, a service, or a combination thereof.

The navigation system 100 can further process a direct user input 114 from the user 112. The direct user input 114 can include an input or a stimulus directly from or provided by the user 112. The direct user input 114 can be provided by or from the user 112 directly to or directly on the first device 102, the third device 108, or the fourth device 110. The direct user input 114 can include the input or the stimulus directly for or related to a corresponding software, application, feature, or a combination thereof.

The navigation system 100 can implement one or more embodiments, an inventive feature or embodiment, a portion therein, or a combination thereof without the direct user input 114. The navigation system 100 can further implement one or more embodiments, an inventive feature or embodiment, a portion therein, or a combination thereof using the direct user input 114 unrelated thereto, previous instances of the direct user input 114, or a combination thereof. Further details are discussed below.

Figure 2:
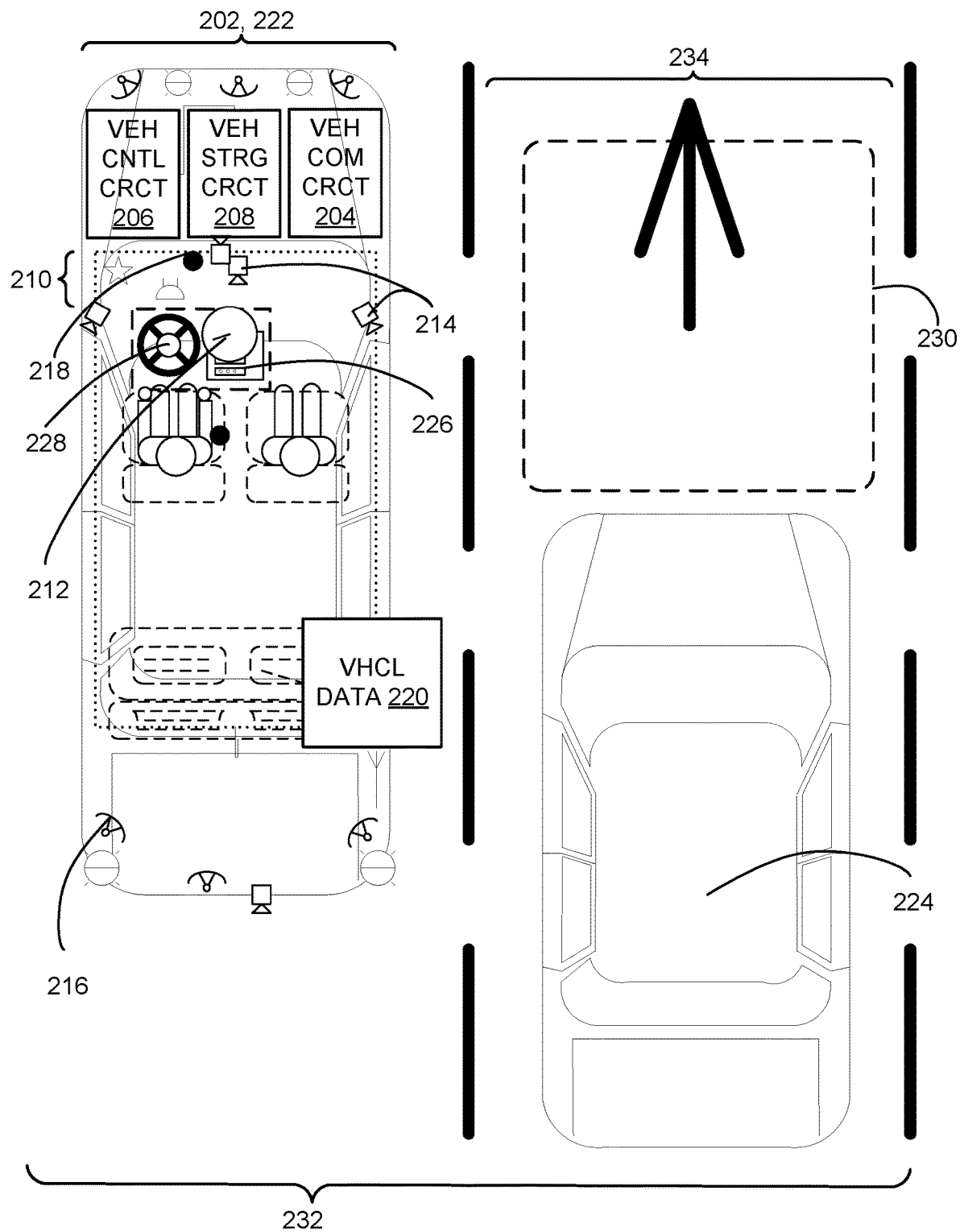
FIG. 2 is an example of a top plan view illustration of various vehicles for the navigation system.

Referring now to FIG. 2, therein is shown an example a top plan view illustration of various vehicles for the navigation system 100 of FIG. 1. The navigation system 100 can include or interact with a control vehicle 202.

The control vehicle 202 is an object or a machine used for transporting people or goods capable of automatically maneuvering or operating the object or the machine. The control vehicle 202 can include vehicles accessible by the user 112 of FIG. 1 for control, maneuver, operation, or a combination thereof. For example, the control vehicle 202 can include a car, a truck, a cart, a drone, or a combination thereof.

The control vehicle 202 can further be controlled or maneuvered without the direct user input 114 of FIG. 1 corresponding to the maneuver or the movement. For example, the control vehicle 202 can include a self-driving vehicle, or a vehicle with automatic maneuvering features, such as smart cruise control or preventative breaking. The control vehicle 202 can include a smart cruise control feature, capable of setting and adjusting the travel speed of the control vehicle 202 without the direct user input 114. Also for example, the control vehicle 202 can be controlled or maneuvered by the navigation system 100, including the navigation system 100 controlling or setting a cruising speed or other physical maneuvers or movements of the control vehicle 202.

The navigation system 100 can further utilize vehicle data 220 from one or more vehicles or devices. The vehicle data 220 can include information regarding the vehicle or the device, such as the first device 102 of FIG. 1, the third device 108 of FIG. 1, the fourth device 110 of FIG. 1, a vehicle corresponding to or associated with the device, or a combination thereof.

The vehicle data 220 can include a status, a state, a setting, a description, or a combination thereof regarding the device or the vehicle itself. The vehicle data 220 can further include information describing or representing surroundings or environment of the device or the vehicle reporting the vehicle data 220. For example, the vehicle data 220 can include speed data, navigation data, accessory or feature status, sensor data, traffic data, or a combination thereof.

Also for example, the vehicle data 220 can include accessory status 226. The accessory status 226 can represent or describe a state of a circuit, a function, a feature, or a combination thereof for the corresponding vehicle. As a more specific example, the accessory status 226 can include an on-off state, a level or magnitude, or a combination thereof for lights, environmental settings, door or trunk, windshield wipers, communication settings, breaking system, signal indicator, or a combination thereof for the corresponding vehicle.

The control vehicle 202 or other vehicles interfacing with the navigation system 100 can include a device, a circuit, one or more specific sensors, such as environmental sensors 210, or a combination thereof for providing assistance or additional information to the user 112 controlling, maneuvering, or operating the control vehicle 202. The control vehicle 202 or any other vehicles can include a vehicle communication circuit 204, a vehicle control circuit 206, a vehicle storage circuit 208, other interfaces, or a combination thereof.

The vehicle storage circuit 208 can include a functional unit or circuit integral to the corresponding control vehicle and configured to store and recall information. The vehicle storage circuit 208 can be a volatile memory, a nonvolatile memory, an internal memory, an external memory, or a combination thereof. For example, the vehicle storage circuit 208 can be a nonvolatile storage such as non-volatile random access memory (NVRAM), Flash memory, disk storage, or a volatile storage such as static random access memory (SRAM).

The vehicle storage circuit 208 can store vehicle software, other relevant data, such as input information, information from sensors, processing results, information predetermined or preloaded by the navigation system 100 or vehicle manufacturer, or a combination thereof.

The vehicle control circuit 206 can include a function unit or circuit integral to the control vehicle 202 and configured to execute or implement instructions. The vehicle control circuit 206 can execute or implement the vehicle software to provide the intelligence of the corresponding vehicle, the navigation system 100, or a combination thereof.

The vehicle control circuit 206 can be implemented in a number of different manners. For example, the vehicle control circuit 206 can be a processor, an application specific integrated circuit (ASIC) an embedded processor, a microprocessor, a hardware control logic, a hardware finite state machine (FSM), a digital signal processor (DSP), or a combination thereof. As a more specific example, the vehicle control circuit 206 can include an engine control unit, one or more central processing unit, or a combination thereof.

The vehicle communication circuit 204 can include a function unit or circuit integral to the corresponding vehicle, such as the control vehicle 202, another vehicle, or a combination thereof. The vehicle communication circuit 204 can be configured to enable external communication to and from the corresponding vehicle. For example, the vehicle communication circuit 204 can permit the control vehicle 202 to communicate with the first device 102, the second device 106 of FIG. 1, the third device 108, the fourth device 110, the network 104 of FIG. 1, or a combination thereof.

The vehicle communication circuit 204 can also function as a communication hub allowing the corresponding control vehicle to function as part of the network 104 and not limited to be an end point or terminal circuit to the network 104. The vehicle communication circuit 204 can include active and passive components, such as microelectronics or an antenna, for interaction with the network 104. For example, the vehicle communication circuit 204 can include a modem, a transmitter, a receiver, a port, a connector, or a combination thereof for wired communication, wireless communication, or a combination thereof.

The vehicle communication circuit 204 can couple with the network 104 to send or receive information directly between the vehicle communication circuit 204 and the first device 102, the second device 106, the third device 108, the fourth device 110, or a combination thereof as end points of the communication, such as for direct line-of-sight communication or peer-to-peer communication. The vehicle communication circuit 204 can further couple with the network 104 to send or receive information through a server or another intermediate device in between endpoints of the communication.

The control vehicle 202 or other vehicles can further include various interfaces. The control vehicle 202 can include one or more interfaces for interaction or internal communication between functional units or circuits of the control vehicle 202. For example, the control vehicle 202 can include one or more interfaces, such as drivers, firmware, wire connections or buses, protocols, or a combination thereof, for the vehicle storage circuit 208, the vehicle control circuit 206, or a combination thereof.

The control vehicle 202 or the other vehicles can further include one or more interfaces for interaction with an occupant, an operator or a driver, a passenger, or a combination thereof relative to the corresponding vehicle. For example, the control vehicle 202 or the other vehicles can include a user interface including input or output devices or circuits, such as a screen or touch screen, a speaker, a microphone, a keyboard or other input devices, an instrument panel, or a combination thereof.

The control vehicle 202 can further include one or more interfaces along with switches or actuators for physically controlling movable components of the control vehicle 202. For example, the control vehicle 202 can include the one or more interfaces along with the controlling mechanisms to physically perform and control the maneuvering of the control vehicle 202, such as for automatic driving, smart cruise control, or maneuvering features.

The functional units or circuits in the control vehicle 202 can work individually and independently of the other functional units or circuits. The control vehicle 202 can work individually and independently from the first device 102, the network 104, the second device 106, other devices or vehicles, or a combination thereof.

The functional units or circuits described above can be implemented in hardware. For example, one or more of the functional units or circuits can be implemented using the a gate, circuitry, a processor, a computer, integrated circuit, integrated circuit cores, a pressure sensor, an inertial sensor, a microelectromechanical system (MEMS), a passive device, a physical non-transitory memory medium containing instructions for performing the software function, a portion therein, or a combination thereof.

The environmental sensors 210 are each a device or a circuit for detecting or identifying environment of the corresponding vehicle. The environmental sensors 210 can detect, identify, determine, or a combination thereof, such as for status, surroundings or movement for the corresponding vehicle. The environmental sensors 210 can detect, identify, determine, or a combination thereof for environment within a cabin of the corresponding vehicle, an environment external to and surrounding the corresponding vehicle, or a combination thereof. The environmental sensors 210 can be implement for the control vehicle 202, a smart vehicle 222, the first device 102, the third device 108, the fourth device 110, or a combination thereof.

For example, the environmental sensors 210 can include a location-movement sensor 212, a visual sensor 214, a radar sensor 216, an accessory sensor 218, or a combination thereof. The location-movement sensor 212 can include a sensor for identifying or calculating a geographic location of the corresponding vehicle or device, determining a movement or speed of the corresponding vehicle or device, or a combination thereof. The location-movement sensor 212 can include an accelerometer, a speedometer, a Global Positioning System (GPS) receiver or device, a gyroscope or a compass, or a combination thereof. The control vehicle 202 can include the environmental sensors 210 other than or in addition to the location-movement sensor 212.

The visual sensor 214 can include a sensor for detecting or determining visual information representing the environment external to and surrounding of the corresponding vehicle. The visual sensor 214 can include a camera attached to or integral with the corresponding vehicle or device. For example, the visual sensor 214 can include a camera, such as forward facing camera, a rear-view or back-up camera, a side-view or a blind-spot camera, or a combination thereof. Also for example, the visual sensor 214 can include an infrared sensor or a night vision sensor.

The visual sensor 214 can further include a camera on the first device 102 or another user device of the user 112 connected to and interacting with a vehicle. The visual sensor 214 can further include a cabin camera for detecting or determining visual information inside the vehicle or cabin of the vehicle.

The radar sensor 216 can include an object-detection system, device, or circuit. The radar sensor 216 can determine or identify an existence of an object or a target, such as an obstacle or another vehicle, external to the corresponding device or vehicle, a relative location or a distance between the object or the target and the corresponding device or vehicle, or a combination thereof.

The radar sensor 216 can utilize radio waves to determine or identify an existence of the object or the target, the relative location or a distance relative to the control vehicle 202 or other corresponding device or vehicle, or a combination thereof. For example, the radar sensor 216 can include a proximity sensor or warning system, such as for an area in front of, behind, adjacent to or on a side of, or a combination thereof geographically or physically relative to the control vehicle 202.

The accessory sensor 218 can include a sensor for determining or detecting a status of a subsystem or a feature of the corresponding device or vehicle. The accessory sensor 218 can determine or detect the status or a setting for windshield wipers, turn signals, gear setting, headlights, or a combination thereof of the corresponding vehicle.

The navigation system 100 can use one or more of the environmental sensors 210 corresponding to one or more devices, one or more vehicles, or a combination thereof to generate the vehicle data 220 describing or representing information regarding the environment within or surrounding the corresponding device or vehicle. The vehicle data 220 can be further processed with the vehicle control circuit 206, stored in the vehicle storage circuit 208, communicated to another device or vehicle through the vehicle control circuit 206, or a combination thereof.

The smart vehicle 222 can include circuit or feature for providing enhanced features or controls. The smart vehicle 222 can include and leverage a computer circuitry for the enhanced features or controls. For example, the smart vehicle 222 can include the environmental sensors 210, such as cameras or proximity sensors, sensor data analysis, automated or driver-less maneuvering features, or a combination thereof. The smart vehicle 222 can generate, process, communicate, or a combination thereof for the vehicle data 220.

The control vehicle 202 can be an instance of the smart vehicle 222. The smart vehicle 222 can further include or be integral with a user device or a mobile device illustrated in FIG. 1. For example, the smart vehicle 222 can include the first device 102, the third device 108, the fourth device 110, or a combination thereof.

As a more specific example, the vehicle communication circuit 204, the vehicle control circuit 206, the vehicle storage circuit 208, the environmental sensors 210, one or more interfaces, or a combination thereof can be included in or make up the first device 102, the third device 108, the fourth device 110, or a combination thereof included in or integral with the smart vehicle 222. Also as a more specific example, the smart vehicle 222 can include or be integral with the first device 102, the third device 108, the fourth device 110, or a combination thereof including an embedded navigation system, an infotainment system, a smart driving or a driver assistance system, a self-driving or a maneuvering system for the vehicle, or a combination thereof.

The navigation system 100 can utilize the vehicle data 220 from devices, vehicles, or a combination thereof to dynamically determine and map a geographical area along with vehicles, pedestrians, objects, or a combination thereof within the geographical area. The navigation system 100 can further utilize the vehicle data 220 to provide information to an unintelligent vehicle 224. As a more specific example, the navigation system 100 can use the vehicle data 220 to dynamically locate and map vehicles on the road. The navigation system 100 can further utilize the data to control movement of the control vehicle 202 at a lane level or granularity.

The navigation system 100 can utilize the vehicle data 220 from the smart vehicle 222 to notify and assist an occupant or an operator of the unintelligent vehicle 224. The navigation system 100 can utilize the vehicle data 220 to provide the occupant or the operator of the unintelligent vehicle 224 with information regarding the unintelligent vehicle 224 or an environment thereof unavailable from the unintelligent vehicle 224. The navigation system 100 can provide the vehicle movement control 228 as a suggestion to the user 112 for maneuvering or operating the unintelligent vehicle 224. Details regarding the utilization and processing of the vehicle data 220 are discussed below.

The unintelligent vehicle 224 is an object or a machine used for transporting people or goods without enhanced assistance features for operating or maneuvering the object or the machine. The unintelligent vehicle 224 can be different from the smart vehicle 222. The unintelligent vehicle 224 can be absent of the environmental sensors 210 other than the location-movement sensor 212, can be incapable of self-generating the vehicle data 220, or sharing the vehicle data 220 with another device, or a combination thereof.

The unintelligent vehicle 224 can include vehicles produced or manufactured before the smart vehicle 222. The unintelligent vehicle 224 can include vehicles accessible by the user 112 for control, maneuver, operation, or a combination thereof.

For example, the unintelligent vehicle 224 can include a car, a truck, a cart, or a combination thereof. As a more specific example, the unintelligent vehicle 224 can include a manual vehicle, a vehicle with basic automatic maneuvering features, such as cruise control or speed regulating feature including a limiter or a warning system.

The unintelligent vehicle 224 can lack part of the smart vehicle's environmental sensors or all of the smart vehicle's environmental sensors 210. It can lack sensors that provide useful information about the vehicle's travel-lane identification 230.

The travel-lane identification 230 is a representation of a traffic lane 232 occupied or travelled by the corresponding vehicle or device. The travel-lane identification 230 can be based on a numbering or a naming system. For example, the travel-lane identification 230 of the traffic lane 232 closest to an outer edge or boundary of the corresponding lane can be "outer" or "last" lane. Also for example, the travel-lane identification 230 of the traffic lane 232 closest to the center of the road, nearest to a lane for opposite direction of travel, or a combination thereof can be numbered "1" or "0", "inner" or "first" lane.

The travel-lane identification 230 can identify, describe, or represent the traffic lane 232 occupied or traversed by the corresponding device or device, including the control vehicle 202. The navigation system 100 can control, maneuver, generate signals or instructions corresponding thereto, or a combination thereof for the control vehicle 202 based on the travel-lane identification 230 and specifically for currently occupied or travelled lane. The navigation system 100 can further generate or process the vehicle movement control 228 based on the vehicle data 220 from multiple vehicles.

The navigation system 100 can process and generate vehicle movement control 228 for controlling or maneuvering the control vehicle 202. The vehicle movement control 228 is an instruction, a signal, a process, a method, a mechanism, or a combination thereof directing or controlling physical movement or travel of the control vehicle 202.

For example, the navigation system 100 can generate the vehicle movement control 228 for maneuvering or controlling the control vehicle 202 based on or according to the travel-lane identification 230 of the control vehicle 202 and specific to the traffic lane 232 occupied or being traversed by the control vehicle 202.

The navigation system 100 can further identify an adjacent lane 234. The adjacent lane 234 can include an instance of the traffic lane 232 next to or abutting the traffic lane 232 occupied or traversed by the control vehicle 202.

The traffic lane 232 can be a roadway designated for use by a single line of vehicles. The traffic lane 232 can include major highways, one-lane roads designated as one-way traffic, express lanes, parking lanes, auxiliary lanes, and dedicated lanes. The traffic lane 232 can also include a lane, such as a section or an area, for travel by one vehicle in a particular direction, such as on a highway or a road.

The navigation system 100 can communicate the vehicle data 220 between the first device 102, the second device 106, the third device 108, the fourth device 110, the network 104, the smart vehicle 222, the control vehicle 202, or a combination thereof. For an illustrative example, the navigation system 100 can include the first device 102 within the control vehicle 202 as an instance of the smart vehicle 222, the third device 108 in the unintelligent vehicle 224, the control vehicle 202, and the fourth device 110 in a separate vehicle, with the group of vehicles within a predetermined distance, relatively located according to a predetermined arrangement, or a combination thereof.

Continuing with the example, the navigation system 100 can use the vehicle data 220 generated or provided from the smart vehicle 222 without the user input 114. The navigation system 100 can utilize the vehicle data 220 to provide information, assist maneuvering, control maneuvers, or a combination thereof for other vehicles, such as the unintelligent vehicle 224, the separate vehicle including the fourth device 110, another instance of the smart vehicle 222, the control vehicle 202, or a combination thereof. The navigation system 100 can communicate the vehicle data 220 directly from the smart vehicle 222 or through the first device 102.

Continuing with the example, the navigation system 100 can communicate the vehicle data 220 through the second device 106 to other devices or vehicles, or directly communicate to the other devices or vehicles, such as for a peer-to-peer communication system. The navigation system 100 can communicate the vehicle data 220 for informing other devices or vehicles of the location or status of the smart vehicle 222 itself, about other vehicles detected and identified around the smart vehicle 222, or a combination thereof.

As a more specific example, the navigation system 100 can use the vehicle data 220 to generate the vehicle movement control 228, such as for steering, braking, setting or adjusting travel speed, accessary control, or a combination thereof. Details regarding the processing of the vehicle movement control 228 are discussed below.

Figure 3:
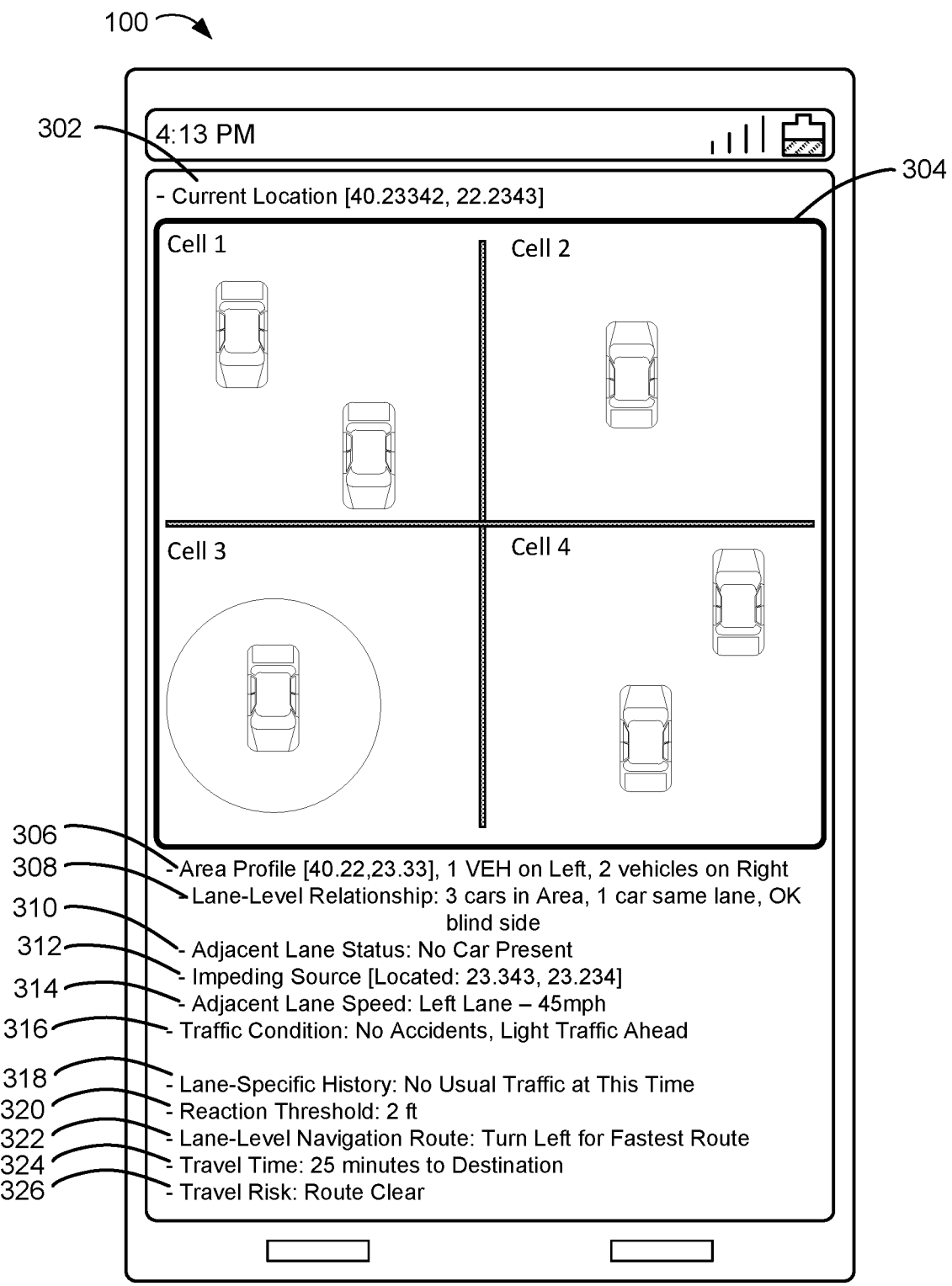
FIG. 3 is an example of the display interface of the navigation system.

Referring now to FIG. 3, therein is shown an example of a display interface of the navigation system 100 of FIG. 1. The display interface can show a current location 302 of a device or vehicle corresponding to the user 112 of FIG. 1. The current location 302 is a representation of a geographic location occupied by the device or vehicle corresponding to the user 112. For example, the current location 302 can represent the geographic location of the first device 102 of FIG. 1, the control vehicle 202 of FIG. 2, or a combination thereof. As a more specific example, the current location 302 can include coordinates, address, or a combination thereof for the first device 102, the control vehicle 202, or a combination thereof.

The navigation system 100 can process or utilize a navigation map 304. The navigation map 304 can include a representation of geographic locations including the location of the control vehicle 202, the smart vehicle 222 of FIG. 2, the unintelligent vehicle 224 of FIG. 2, or a combination thereof. The navigation map 304 can further include a map of the location of the first device 102, the third device 108 of FIG. 1, the fourth device 110 of FIG. 1, or a combination therefore.

The navigation map 304 can further describe a local map of the area in close proximity to a particular area or neighborhood. For example, the navigation map 304 can be a plan, chart, diagram, survey, plat, plot, guide, atlas, or a globe of a particular area. The navigation map 304 can also include an area profile 306, traffic condition 316, or a combination thereof.

The area profile 306 is a description of a situation or a condition regarding a particular area or region represented by or within the navigation map 304. The area profile 306 can locate, identify, track, or a combination thereof for one or more vehicles, associated devices, associated operator, or a combination thereof within the corresponding area or region.

The area profile 306 can provide various information, including the location, regarding the smart vehicle 222, the unintelligent vehicle 224, the control vehicle 202, or a combination thereof in a certain geographic location. The area profile 306 can further provide details on a vehicle's movement, the speed of travel of a vehicle, the vehicle data 220 of FIG. 2 from one or more of the smart vehicle 222 or the control vehicle therein, the location of any number of vehicles, or a combination thereof.

The navigation system 100 can process the area profile 306 based on the vehicle data 220 from one or more vehicles or devices located within or around the corresponding geographic area of the navigation map 304. The navigation system 100 can generate, determine, maintain, update, or a combination thereof for the area profile 306 to represent real-time or current representation of the current condition, locations, status, movements, or a combination thereof.

The area profile 306 can further provide a lane-level relationship 308, an adjacent lane status 310, an impeding source location 312, an adjacent lane speed 314, or a combination thereof. The lane-level relationship 308 is a description of geographic or spatial relationship between vehicles relative to one or more instances of the traffic lane 232 of FIG. 2. The lane-level relationship 308 can describe relative positions of two or more vehicles. The lane-level relationship can describe relative positions of one or more vehicles in relation to the control vehicle 202.

The lane-level relationship 308 can include descriptions for vehicles traveling along the same instance or adjacent instances of the traffic lane 232. For example, the lane-level relationship 308 can describe one vehicle located or traveling in front or behind the control vehicle 202 based on direction of travel, located or traveling within a reaction threshold 320 from each other, adjacent to each other, one vehicle located or traveling in another vehicle's blind spot, or a combination thereof.

The lane-level relationship 308 can further include a quantity of cars, a separation measure, such as for number of cars or a distance measure, as well as their description of travel relevant to each other. For example, the lane-level relationship 308 can represent a specific vehicle targeted by the process or for analysis of the navigation system is the nth vehicle ahead or behind the control vehicle 202. For further illustrative example, the lane-level relationship 308 can include a description or an indication of one or more vehicles traveling in the same direction as the control vehicle 202, traveling in a lane next to the smart vehicle 222, traveling in the opposite direction of the control vehicle 202, or a combination thereof of movements.

The adjacent lane status 310 provides a description or a representation of a condition, a situation, a context, or a combination thereof for one or more instances of the adjacent lane 234 of FIG. 2 relative to the control vehicle 202. For example, the adjacent lane status 310 can include a category, a label, a case, a value, or a combination thereof. Also for example, the adjacent lane status 310 can represent specific events or conditions, such as for sudden stops or speed reductions, events or gatherings affecting the adjacent lane 234, an accident or debris in or affecting the adjacent lane 234, a maneuver related to or designated for the adjacent lane 234, a time of day or week, or a combination thereof.

The navigation system 100 can utilize the vehicle data 220 to determine the adjacent lane status 310 for the subject or the reference point of the unintelligent vehicle 224. The area profile 306 can include and track the adjacent lane status 310 relative to the control vehicle 202.

The impeding source location 312 provides representation of geographic locations affecting or causing a traffic condition or status. The impeding source location 312 can include a location corresponding to a level of vehicle density, a specific flow rate, the vehicle's speed, an accident or a stopped vehicle, a road hazard, or a combination thereof. The impeding source location 312 can be specific to or identified to be within a specific corresponding instance of the traffic lane 232.

The impeding source location 312 can further include the geographic locations corresponding to slower or faster traffic flow in comparison to surrounding area, road segments, preceding or following road segment, or a combination thereof. The impeding source location 312 can be determined using the environmental sensors 210 of FIG. 2 and without the user input 114 of FIG. 1. The navigation system 100 can include and track the impeding source location 312 in and using the area profile 306.

The adjacent lane speed 314 represents current speed of vehicles traveling in the adjacent lane 234. The adjacent lane speed 314 can be calculated using the vehicle data 220. The adjacent lane speed 314 can further be based on the vehicle data 220 self-reported by the vehicle or the device determined to be traveling in the adjacent lane 234.

The adjacent lane speed 314 can further be evaluated through external road sensors, communicated through the server, the smart vehicle 222, the control vehicle 202, or a combination thereof. As an example, the adjacent lane speed 314 can be formulated by determining the speed of the vehicle adjacent or in close proximity to the control vehicle 202. The speed at which vehicle travels in close proximity to the control vehicle 202 is used to set the speed information for that specific lane.

The area profile 306 can further include the traffic condition 316 within the corresponding region or zone. The traffic condition 316 provides information of factors or events that can affect a state or a flow of traffic. The traffic condition 316 can significantly influence movement or speeds of one or more vehicles. The traffic condition 316 can further include a rate or a speed at which traffic flows. The traffic condition 316 can include traffic flow that is specific to each instance of the traffic lane 232 for the area or region corresponding to the area profile 306.

The traffic condition 316 can further include weather information or weather advisory notifications. The traffic condition 316 can also include navigation obstructions, delays, or stoppage such as roadway closures, train crossings, bus stops, drawbridges, special events, accidents, stopped vehicle, or any combination thereof.

The navigation system 100 can determine, store, and update a lane-specific history 318. The lane-specific history 318 is a record of information associated with specific corresponding instance of the traffic lane 232. The lane-specific history 318 can include the traffic condition 316 for the corresponding specific instance of the traffic lane 232, such as for flow rate, accident or hazard, event, a number of passing or occupying vehicles, a time associated thereto, an event or a condition determined as a cause, or a combination thereof.

The reaction threshold 320 is a limit on measure of separation between the control vehicle 202 and a trigger, such as another vehicle, location, condition or event, or a combination thereof, for maneuvering or controlling the control vehicle 202. The navigation system 100 can maneuver or control the control vehicle 202 in response to the trigger when the trigger is located within the reaction threshold 320.

The navigation system 100 can compare the lane-level relationship 308 between the control vehicle 202 and the trigger with the reaction threshold 320 for maneuvering or controlling the control vehicle 202. The navigation system 100 can generate, communicate, implement or execute, or a combination thereof for the vehicle movement control 228 of FIG. 2 using the reaction threshold 320.

The navigation system 100 can further calculate and utilize a lane-level navigation route 322 for optimizing travel time 324, travel risk 326, or a combination thereof. The lane-level navigation route 322 is guidance information for directing the control vehicle 202 to a specified destination and including guidance information specifying the traffic lane 232 along the route.

The lane-level navigation route 322 can specify the traffic lane 232 that can optimize the travel time 324, the travel risk 326, such as for minimizing a possibility or probability of an accident. The lane-level navigation route 322 can specify the traffic lane 232 in addition to or separate from identifying lanes as required to maneuver the control vehicle 202, such as for exit lanes, designated turn lanes, ramps, merging lanes, or a combination thereof.

Figure 4:
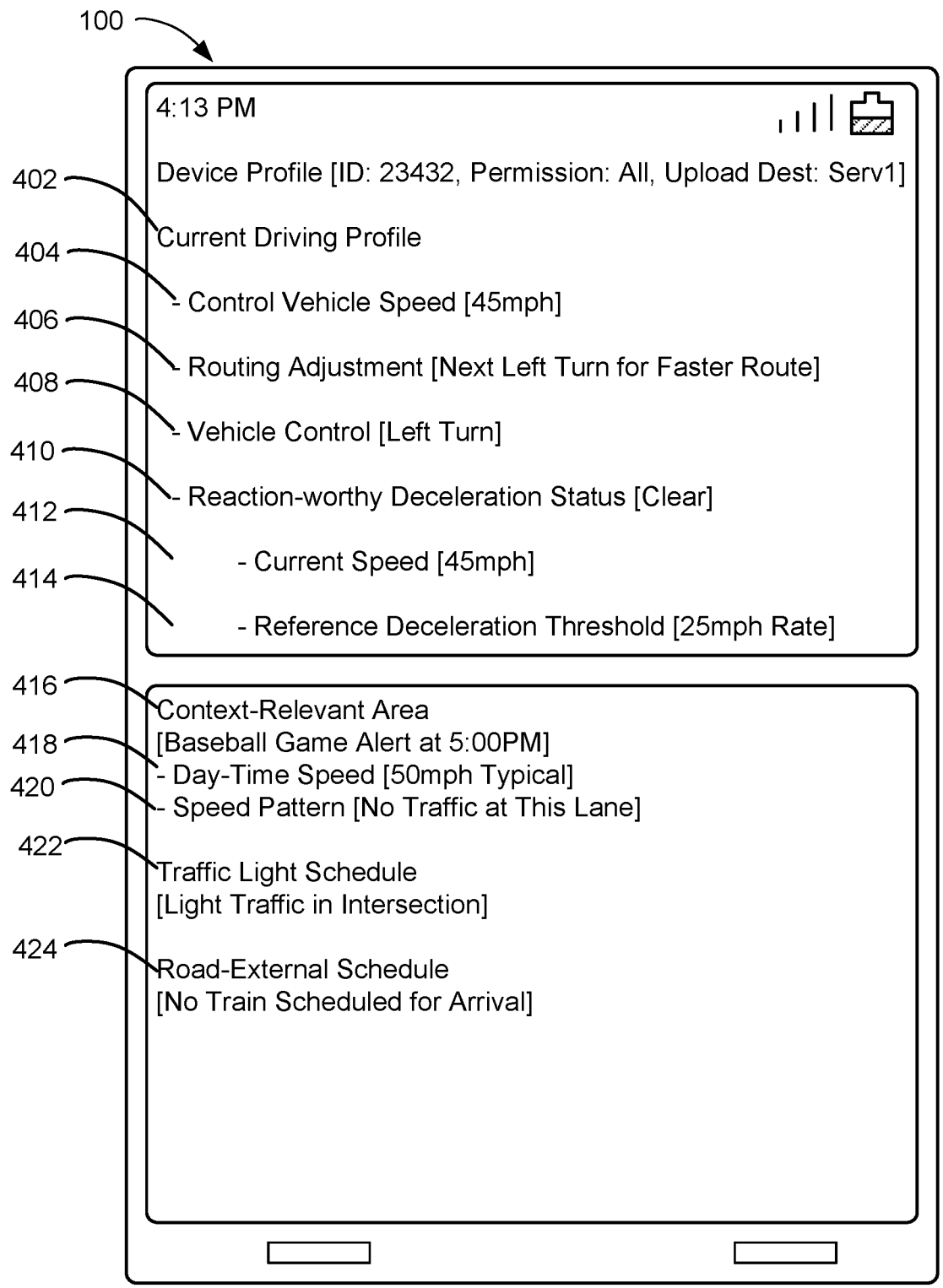
FIG. 4 is a further example of the display interface of the navigation system.

Referring now to FIG. 4, therein is shown a further example of a display interface of the navigation system 100 of FIG. 1. The navigation system 100 can further process or utilize a current driving profile 402. The current driving profile 402 provides details about a vehicle's orientation, location, or movement relative to other vehicles. The current driving profile 402 can further provide details of a current traffic situation for the control vehicle 202 of FIG. 2.

The navigation system 100 can process the current driving profile 402 using the smart vehicle 222 of FIG. 2, the unintelligent vehicle 224 of FIG. 2, the control vehicle 202, a vehicle corresponding to one or more of the devices for the navigation system 100, any other vehicle, or a combination thereof as a subject or a focus. The corresponding subject or the focus can be the receiver of the notices or can function as a reference point for the process. The navigation system 100 can include the current driving profile 402 in or as part of the area profile 306 of FIG. 3.

The current driving profile 402 can further include control signals that provide direction, guidelines, navigation, or suggestions. The current driving profile 402 can further include the lane-level navigation route 322 of FIG. 3. The control signals are ways to direct one or more vehicles to a specific speed parameter or general navigation. The control signals can include signals or instructions for physically moving and operating the vehicle using the steering control, the elevation control, and other automated accessories using the accessory status 226 of FIG. 2. The control signals associated with the current driving profile 402 can include a control vehicle speed 404, a routing adjustment 406, vehicle control 408, or a combination thereof.

The control vehicle speed 404 is the speed that the vehicle travels at in a specific lane or zone. The control vehicle speed 404 can provide the vehicle with the speed setting for the vehicle, set for the cruise control, or a combination thereof. The control vehicle speed 404 can be a dynamic control signal or parameter where it can change from one moment to another in real-time. The control vehicle speed 404 can further be static according to the lane speed parameter.

The control vehicle speed 404 can be the same or different value as the adjacent lane speed 314 of FIG. 3. The control vehicle speed 404 included in or be part of the vehicle movement control 228 of FIG. 2. The control vehicle speed 404 can be processed by the first device 102 of FIG. 1, the second device 106 of FIG. 1, the third device 108 of FIG. 1, the fourth device 110 of FIG. 1, or a combination thereof. The control vehicle speed 404 can also be processed by the control vehicle 202, the smart vehicle 222, the unintelligent vehicle 224, or a combination thereof.

The routing adjustment 406 is information for adjusting a planned route or direction. The routing adjustment 406 can be a suggestion or an automatic deviation from the original route. The routing adjustment 406 can be for avoiding a context-relevant area 416, the impeding source location 312 of FIG. 3, another area associated thereto, a specific instance of the traffic lane 232 of FIG. 2 associated thereto, or a combination thereof.

The routing adjustment 406 can specify an identification of a specific lane for travel relative to or as influenced by the impeding source location 312. For example, the routing adjustment 406 can change a target travel lane to avoid a specific lane at a location, avoid the impeding source location 312, avoid traffic or congestion on specific lanes based on or due to the impeding source location 312, or a combination thereof.

The routing adjustment 406 can be processed or implemented with the first device 102, the second device 106, the third device 108, the fourth device 110, or a combination thereof. The routing adjustment 406 can further be processed or implemented with the smart vehicle 222, the unintelligent vehicle 224, the control vehicle 202, or a combination thereof.

The vehicle control 408 can provide instructions or commands for controlling the direction at which the vehicle will navigate. The vehicle control 408 can further control a spatial direction or corresponding maneuver on navigating to the left, right, stop, or to go, slow down, accelerate, reverse, or a combination thereof for the control vehicle 202.

The vehicle control 408 can be utilize by the smart vehicle 222, the control vehicle 202, the unintelligent vehicle 224, or a combination thereof. For the unintelligent vehicle 224, the vehicle control 408 can be a communication or a suggestion to an operator of the unintelligent vehicle 224 through one or more devices associated with the operator.

The current driving profile 402 further can include input signals or navigational information that can be processed to provide the control vehicle 202 direction on how to proceed. The input signals can provide information and stimulus to the vehicle that affect the navigation, movement, routing, direction, or a combination thereof of the vehicle. The input signals can be received from the smart vehicle 222, the control vehicle 202, the first device 102, the second device 106, the fourth device 110, the user 112 of FIG. 1, or a combination thereof. The input signals associated with the current driving profile 402 can also include a reaction-worthy deceleration status 410.

The reaction-worthy deceleration status 410 provides notice or a representation that a vehicle has decelerated at or exceeding a specific rate. The reaction-worthy deceleration status 410 can include information relative to the reference vehicle, such as for a vehicle ahead or in front of the reference vehicle relative to a direction of travel of the reference vehicle.

The reaction-worthy deceleration status 410 can utilize a current speed 412, a reference deceleration threshold 414, or a combination thereof to determine when to alert or provide warning, cause or implement reactionary maneuvers, or a combination thereof regarding a relevant vehicle that has slowed down or stopped. The current speed 412 can represent a measured or reported speed of corresponding vehicles. The current speed 412 can be part of or included in the current driving profile 402 for the corresponding vehicle, such as the control vehicle 202, the smart vehicle 222, the unintelligent vehicle 224, or a combination thereof.

The navigation system 100 can determine the current speed 412 based on the vehicle data 220 of FIG. 2 reporting the current speed 412 of the corresponding vehicle, either through the vehicle or a device associated with the vehicle. The navigation system 100 can further determine the current speed 412 based on calculating the current speed 412 of a target vehicle based on the vehicle data 220 from another vehicle observing or including information regarding the target vehicle. The navigation system 100 can calculate based on the current speed 412 of the reporting vehicle, sensor rate, a difference in the target vehicle between data points and associated times of the data points, or a combination thereof.

The reference deceleration threshold 414 is a quantitative parameter or a limit utilized to determine that a vehicle has decelerated at a rate or to a speed that would require other vehicles to respond. The reference deceleration threshold 414 can include a deceleration rate, a force or a position of a brake pedal, a status or a magnitude associated with the braking system, or a combination thereof. The reference deceleration threshold 414 can be used to determine the reaction-worthy deceleration status 410 of the corresponding vehicle.

The navigation system 100 can alert the reference vehicle that a separate vehicle ahead or near the reference vehicle has abruptly stopped and possibly affecting the reference vehicle based on the reaction-worthy deceleration status 410 and the reference deceleration threshold 414. The navigation system 100 can further generate, communicate, implement or execute, or a combination thereof for the vehicle control 408 based on the reaction-worthy deceleration status 410 of one or more vehicles in the reaction threshold 320 of FIG. 3.

The navigation system 100 can further process or utilize the context-relevant area 416. The context-relevant area 416 is a location that is triggering an affect or influence in an area or zone within the navigation map 304 of FIG. 3. The context-relevant area 416 can be an event or an occurrence such a game, a rally, festival, parade, a random phenomenon, or a scheduled activity that can cause a change of plan, attitude, guidance, or behavior. The context-relevant area 416 can include the impeding source location 312. The context-relevant area 416 can be utilized by the first device 102, the third device 108, the fourth device 110, or a combination thereof.

The context-relevant area 416 can include information regarding specific instances of the traffic lane 232 associated with the event or the occurrence. For example, the context-relevant area 416 can specify average or typical flow rate for each of the lanes relative to times associated with the event or the occurrence.

The context-relevant area 416 can also be use by the smart vehicle 222, the unintelligent vehicle 224, the control vehicle 202, or a combination thereof. The context-relevant area 416 can also be associated with a day-time speed 418 and speed pattern 420 which will provide more information within the relevant area.

The day-time speed 418 is archived speed information on a specific lane during a specific time of day. The day-time speed 418 can be used to forecast traffic to provide the fastest navigational route. This information can be used to allow traffic controllers, the smart vehicle 222, the unintelligent vehicle 224, the control vehicle 202, or a combination thereof to direct the flow of traffic in the smoothest condition.

The speed pattern 420 provides the historic pattern of vehicle speed within a given lane. The speed pattern 420 can also provide information that a specific lane is more congested than others. The speed pattern 420 can also provide traffic controllers, the smart vehicle 222, the control vehicle 202, the unintelligent vehicle 224, or a combination thereof information that can aid in traffic control within a specific lane.

The navigation system 100 can further process a traffic light schedule 422. The traffic light schedule 422 is information regarding control mechanisms for managing traffic signals. The traffic light schedule 422 can include a time, a frequency, a location, a condition or an event, a correlation or a relationship between various elements, or a combination thereof.

The traffic light schedule 422 can further provide information associated with the flow of traffic or vehicle moving through a specific lane, such as for ramps or turn-lanes, during certain times of the day. The service provider, traffic controller, or a combination thereof can use the information from the user device, the vehicle, or a combination thereof to adjust or implement the traffic light schedule 422.

The navigation system 100 can further utilize a road-external schedule 424. The road-external schedule 424 is information regarding timing of external influence affecting traffic flow. The road-external schedule 424 can include timing or schedule of influences external to the road. These occurrences can be schedules that include relationships to draw bridges, trains, transit vehicles, boat traffic, air traffic control, or a combination thereof. The navigation system 100 can use the road-external schedule 424 to further determine flow rates, patterns, traffic behavior, associated events, or a combination thereof for related or affected traffic lanes.

Figure 5:
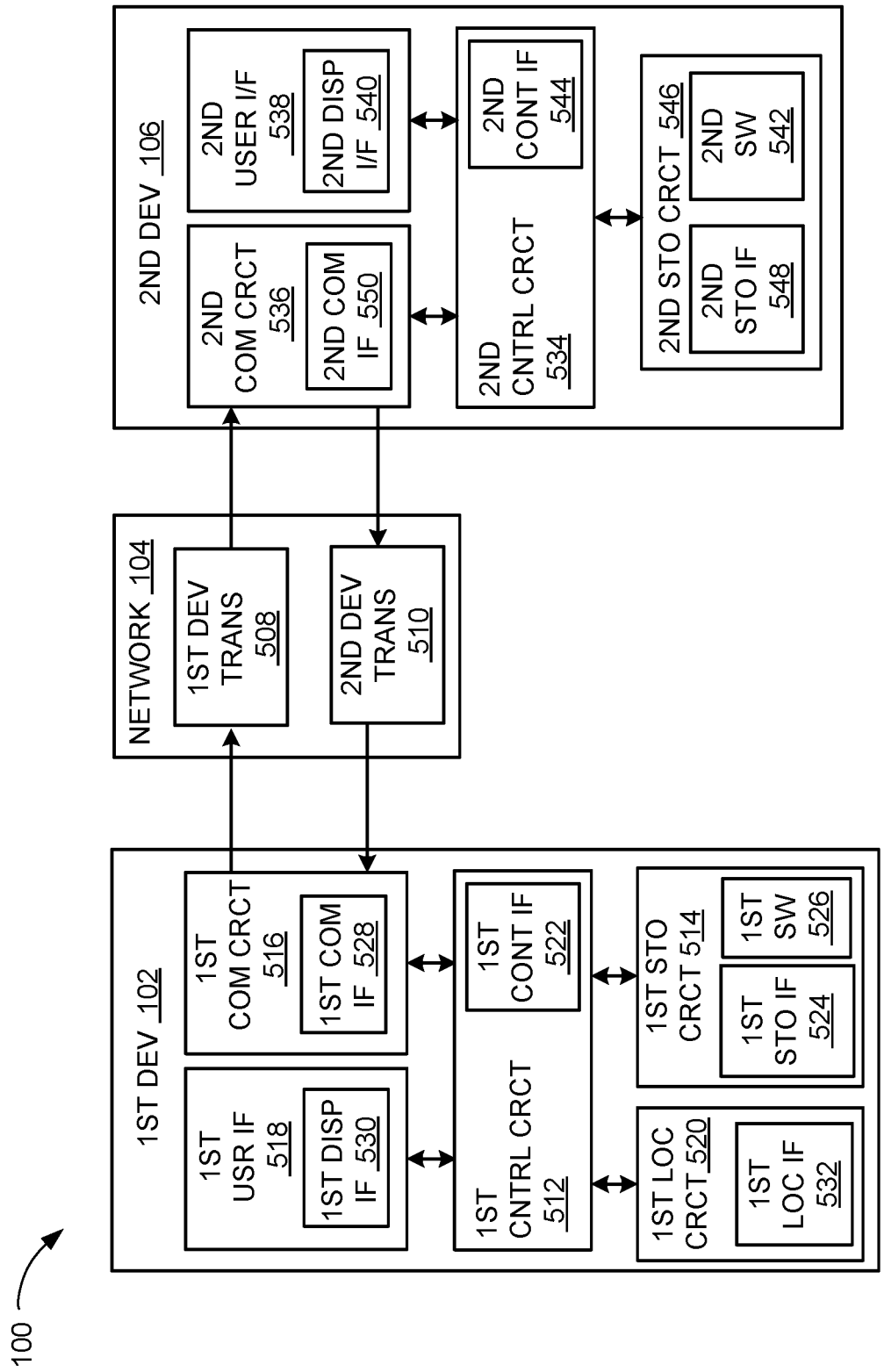
FIG. 5 is an exemplary block diagram of the navigation system.

Referring now to FIG. 5, therein is shown an exemplary block diagram of the navigation system 100 of FIG. 1. The navigation system 100 can include the first device 102 of FIG. 1, the network 104 of FIG. 1, and the second device 106 of FIG. 1. The first device 102 can send information in a first device transmission 508 of FIG. 5 over the network 104 to the second device 106. The second device 106 can send information in a second device transmission 510 of FIG. 5 over the network 104 to the first device 102.

For illustrative purposes, the navigation system 100 is shown with the first device 102 as a client device, although it is understood that the navigation system 100 can include the first device 102 as a different type of device. For example, the first device 102 can be a server containing a display interface.

Also for illustrative purposes, the navigation system 100 is shown with the second device 106 as a server, although it is understood that the navigation system 100 can include the second device 106 as a different type of device. For example, the second device 106 can be a client device.

Also for illustrative purposes, the navigation system 100 is shown with interaction between the first device 102 and the second device 106. However, it is understood that the first device 102 can similarly interact with the third device 108 of FIG. 1, the fourth device 110 of FIG. 1, or a combination thereof. Similarly, the second device 106 can similarly interact with the third device 108, the fourth device 110, or a combination thereof.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control circuit 512 of FIG. 5, a first storage circuit 514 of FIG. 5, a first communication circuit 516 of FIG. 5, and a first user interface 518 of FIG. 5, and a first location circuit 520 of FIG. 5. The first control circuit 512 can include a first control interface 522 of FIG. 5. The first control circuit 512 can execute a first software 526 of FIG. 5 to provide the intelligence of the navigation system 100.

The first control circuit 512 can be implemented in a number of different manners. For example, the first control circuit 512 can be a processor, an application specific integrated circuit (ASIC) an embedded processor, a microprocessor, a hardware control logic, a hardware finite state machine (FSM), a digital signal processor (DSP), or a combination thereof. The first control interface 522 can be used for communication between the first control circuit 512 and other functional units or circuits in the first device 102. The first control interface 522 can also be used for communication that is external to the first device 102.

The first control interface 522 can receive information from the other functional units/circuits or from external sources, or can transmit information to the other functional units/circuits or to external destinations. The external sources and the external destinations refer to sources and destinations external to the first device 102.

The first control interface 522 can be implemented in different ways and can include different implementations depending on which functional units/circuits or external units/circuits are being interfaced with the first control interface 522. For example, the first control interface 522 can be implemented with a pressure sensor, an inertial sensor, a microelectromechanical system (MEMS), optical circuitry, waveguides, wireless circuitry, wireline circuitry, or a combination thereof.

The first storage circuit 514 can store the first software 526. The first storage circuit 514 can also store the relevant information, such as data representing incoming images, data representing previously presented image, sound files, or a combination thereof.

The first storage circuit 514 can be a volatile memory, a nonvolatile memory, an internal memory, an external memory, or a combination thereof. For example, the first storage circuit 514 can be a nonvolatile storage such as non-volatile random access memory (NVRAM), Flash memory, disk storage, or a volatile storage such as static random access memory (SRAM).

The first storage circuit 514 can include a first storage interface 524 of FIG. 5. The first storage interface 524 can be used for communication between the first storage circuit 514 and other functional units or circuits in the first device 102. The first storage interface 524 can also be used for communication that is external to the first device 102.

The first storage interface 524 can receive information from the other functional units/circuits or from external sources, or can transmit information to the other functional units/circuits or to external destinations. The external sources and the external destinations refer to sources and destinations external to the first device 102.

The first storage interface 524 can include different implementations depending on which functional units/circuits or external units/circuits are being interfaced with the first storage circuit 514. The first storage interface 524 can be implemented with technologies and techniques similar to the implementation of the first control interface 522.

The first communication circuit 516 can enable external communication to and from the first device 102. For example, the first communication circuit 516 can permit the first device 102 to communicate with the second device 106 of FIG. 1, an attachment, such as a peripheral device or a desktop computer, and the network 104.

The first communication circuit 516 can also function as a communication hub allowing the first device 102 to function as part of the network 104 and not limited to be an end point or terminal circuit to the network 104. The first communication circuit 516 can include active and passive components, such as microelectronics or an antenna, for interaction with the network 104.

The first communication circuit 516 can include a first communication interface 528 of FIG. 5. The first communication interface 528 can be used for communication between the first communication circuit 516 and other functional units or circuits in the first device 102. The first communication interface 528 can receive information from the other functional units/circuits or can transmit information to the other functional units or circuits.

The first communication interface 528 can include different implementations depending on which functional units or circuits are being interfaced with the first communication circuit 516. The first communication interface 528 can be implemented with technologies and techniques similar to the implementation of the first control interface 522.

The first user interface 518 allows a user (not shown) to interface and interact with the first device 102. The first user interface 518 can include an input device and an output device. Examples of the input device of the first user interface 518 can include a keypad, a touchpad, soft-keys, a keyboard, a microphone, an infrared sensor for receiving remote signals, or any combination thereof to provide data and communication inputs.

The first user interface 518 can include a first display interface 530 of FIG. 5. The first display interface 530 can include an output device. The first display interface 530 can include a display, a projector, a video screen, a speaker, or any combination thereof.

The first control circuit 512 can operate the first user interface 518 to display information generated by the navigation system 100. The first control circuit 512 can also execute the first software 526 for the other functions of the navigation system 100, including receiving location information from the first location circuit 520. The first control circuit 512 can further execute the first software 526 for interaction with the network 104 via the first communication circuit 516.

The first location circuit 520 can generate location information, current heading, current acceleration, and current speed of the first device 102, as examples. The first location circuit 520 can be implemented in many ways. For example, the first location circuit 520 can function as at least a part of the global positioning system, an inertial navigation system, a cellular-tower location system, a pressure location system, or any combination thereof. Also, for example, the first location circuit 520 can utilize components such as an accelerometer or global positioning system (GPS) receiver.

The first location circuit 520 can include a first location interface 532 of FIG. 5. The first location interface 532 can be used for communication between the first location circuit 520 and other functional units or circuits in the first device 102. The first location interface 532 can also be used for communication external to the first device 102.

The first location interface 532 can receive information from the other functional units/circuits or from external sources, or can transmit information to the other functional units/circuits or to external destinations. The external sources and the external destinations refer to sources and destinations external to the first device 102.

The first location interface 532 can include different implementations depending on which functional units/circuits or external units/circuits are being interfaced with the first location circuit 520. The first location interface 532 can be implemented with technologies and techniques similar to the implementation of the first control circuit 512.

The second device 106 can be optimized for implementing an embodiment of the present invention in a multiple device embodiment with the first device 102. The second device 106 can provide the additional or higher performance processing power compared to the first device 102. The second device 106 can include a second control circuit 534 of FIG. 5, a second communication circuit 536 of FIG. 5, a second user interface 538 of FIG. 5, and a second storage circuit 546 of FIG. 5.

The second user interface 538 allows a user (not shown) to interface and interact with the second device 106. The second user interface 538 can include an input device and an output device. Examples of the input device of the second user interface 538 can include a keypad, a touchpad, soft-keys, a keyboard, a microphone, or any combination thereof to provide data and communication inputs. Examples of the output device of the second user interface 538 can include a second display interface 540 of FIG. 5. The second display interface 540 can include a display, a projector, a video screen, a speaker, or any combination thereof.

The second control circuit 534 can execute a second software 542 of FIG. 5 to provide the intelligence of the second device 106 of the navigation system 100. The second software 542 can operate in conjunction with the first software 526. The second control circuit 534 can provide additional performance compared to the first control circuit 512.

The second control circuit 534 can operate the second user interface 538 to display information. The second control circuit 534 can also execute the second software 542 for the other functions of the navigation system 100, including operating the second communication circuit 536 to communicate with the first device 102 over the network 104.

The second control circuit 534 can be implemented in a number of different manners. For example, the second control circuit 534 can be a processor, an embedded processor, a microprocessor, hardware control logic, a hardware finite state machine (FSM), a digital signal processor (DSP), or a combination thereof.

The second control circuit 534 can include a second control interface 544 of FIG. 5. The second control interface 544 can be used for communication between the second control circuit 534 and other functional units or circuits in the second device 106. The second control interface 544 can also be used for communication that is external to the second device 106.

The second control interface 544 can receive information from the other functional units/circuits or from external sources, or can transmit information to the other functional units/circuits or to external destinations. The external sources and the external destinations refer to sources and destinations external to the second device 106.

The second control interface 544 can be implemented in different ways and can include different implementations depending on which functional units/circuits or external units/circuits are being interfaced with the second control interface 544. For example, the second control interface 544 can be implemented with a pressure sensor, an inertial sensor, a microelectromechanical system (MEMS), optical circuitry, waveguides, wireless circuitry, wireline circuitry, or a combination thereof.

A second storage circuit 546 can store the second software 542. The second storage circuit 546 can also store the information such as data representing incoming images, data representing previously presented image, sound files, or a combination thereof. The second storage circuit 546 can be sized to provide the additional storage capacity to supplement the first storage circuit 514.

For illustrative purposes, the second storage circuit 546 is shown as a single element, although it is understood that the second storage circuit 546 can be a distribution of storage elements. Also for illustrative purposes, the navigation system 100 is shown with the second storage circuit 546 as a single hierarchy storage system, although it is understood that the navigation system 100 can include the second storage circuit 546 in a different configuration. For example, the second storage circuit 546 can be formed with different storage technologies forming a memory hierarchal system including different levels of caching, main memory, rotating media, or off-line storage.

The second storage circuit 546 can be a volatile memory, a nonvolatile memory, an internal memory, an external memory, or a combination thereof. For example, the second storage circuit 546 can be a nonvolatile storage such as non-volatile random access memory (NVRAM), Flash memory, disk storage, or a volatile storage such as static random access memory (SRAM).

The second storage circuit 546 can include a second storage interface 548 of FIG. 5. The second storage interface 548 can be used for communication between the second storage circuit 546 and other functional units or circuits in the second device 106. The second storage interface 548 can also be used for communication that is external to the second device 106.

The second storage interface 548 can receive information from the other functional units/circuits or from external sources, or can transmit information to the other functional units/circuits or to external destinations. The external sources and the external destinations refer to sources and destinations external to the second device 106.

The second storage interface 548 can include different implementations depending on which functional units/circuits or external units/circuits are being interfaced with the second storage circuit 546. The second storage interface 548 can be implemented with technologies and techniques similar to the implementation of the second control interface 544.

The second communication circuit 536 can enable external communication to and from the second device 106. For example, the second communication circuit 536 can permit the second device 106 to communicate with the first device 102 over the network 104.

The second communication circuit 536 can also function as a communication hub allowing the second device 106 to function as part of the network 104 and not limited to be an end point or terminal unit or circuit to the network 104. The second communication circuit 536 can include active and passive components, such as microelectronics or an antenna, for interaction with the network 104.

The second communication circuit 536 can include a second communication interface 550 of FIG. 5. The second communication interface 550 can be used for communication between the second communication circuit 536 and other functional units or circuits in the second device 106. The second communication interface 550 can receive information from the other functional units/circuits or can transmit information to the other functional units or circuits.

The second communication interface 550 can include different implementations depending on which functional units or circuits are being interfaced with the second communication circuit 536. The second communication interface 550 can be implemented with technologies and techniques similar to the implementation of the second control interface 544.

The first communication circuit 516 can couple with the network 104 to send information to the second device 106 in the first device transmission 508. The second device 106 can receive information in the second communication circuit 536 from the first device transmission 508 of the network 104.

The second communication circuit 536 can couple with the network 104 to send information to the first device 102 in the second device transmission 510. The first device 102 can receive information in the first communication circuit 516 from the second device transmission 510 of the network 104. The navigation system 100 can be executed by the first control circuit 512, the second control circuit 534, or a combination thereof. For illustrative purposes, the second device 106 is shown with the partition containing the second user interface 538, the second storage circuit 546, the second control circuit 534, and the second communication circuit 536, although it is understood that the second device 106 can include a different partition. For example, the second software 542 can be partitioned differently such that some or all of its function can be in the second control circuit 534 and the second communication circuit 536. Also, the second device 106 can include other functional units or circuits not shown in FIG. 5 for clarity.

The functional units or circuits in the first device 102 can work individually and independently of the other functional units or circuits. The first device 102 can work individually and independently from the second device 106 and the network 104.

The functional units or circuits in the second device 106 can work individually and independently of the other functional units or circuits. The second device 106 can work individually and independently from the first device 102 and the network 104.

The functional units or circuits described above can be implemented in hardware. For example, one or more of the functional units or circuits can be implemented using the a gate, circuitry, a processor, a computer, integrated circuit, integrated circuit cores, a pressure sensor, an inertial sensor, a microelectromechanical system (MEMS), a passive device, a physical non-transitory memory medium containing instructions for performing the software function, a portion therein, or a combination thereof.

For illustrative purposes, the navigation system 100 is described by operation of the first device 102 and the second device 106. It is understood that the first device 102 and the second device 106 can operate any of the modules and functions of the navigation system 100.

Figure 6:
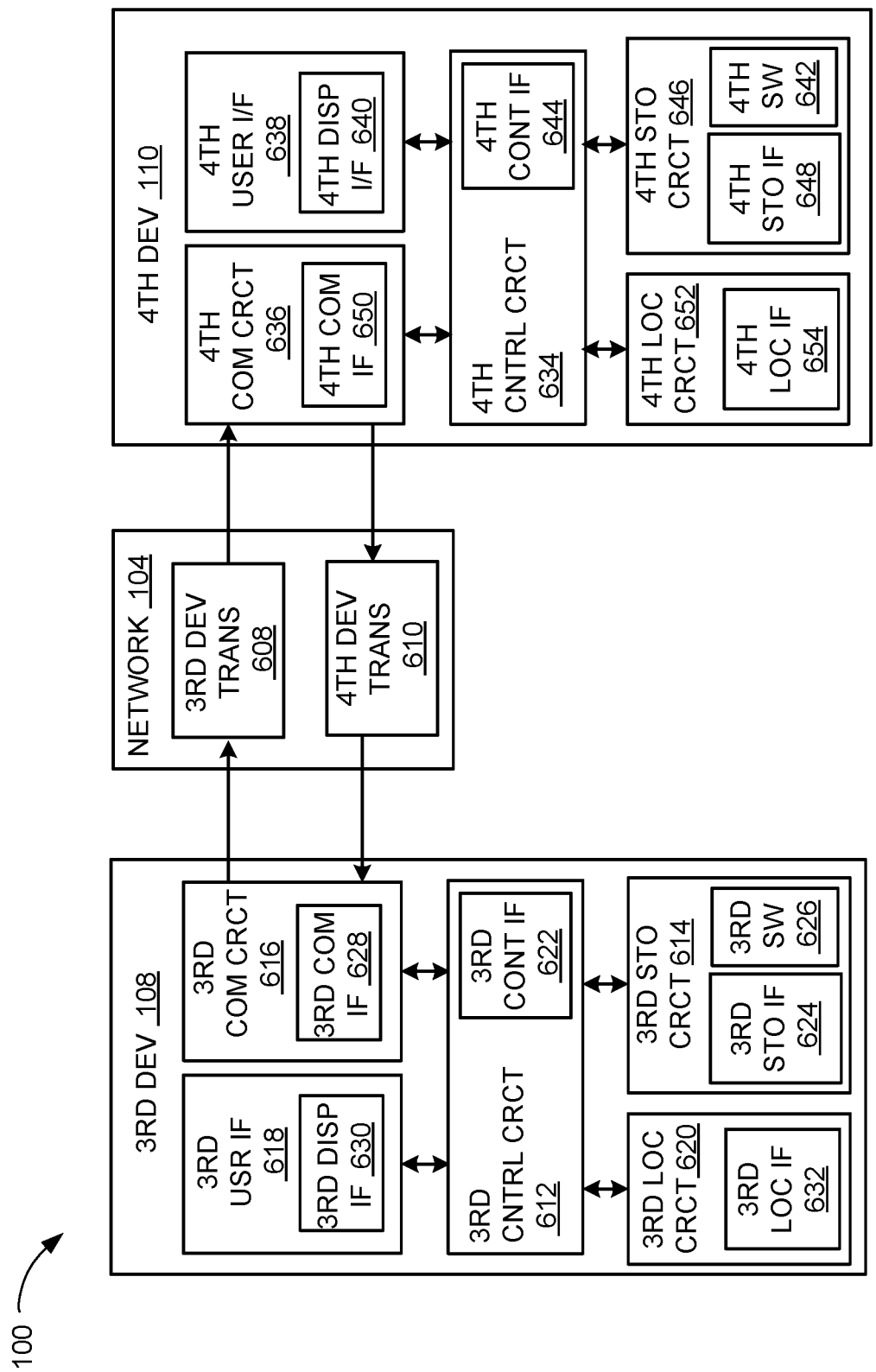
FIG. 6 is a further exemplary block diagram of the navigation system.

Referring now to FIG. 6, therein is shown an exemplary block diagram of the navigation system 100 of FIG. 1. The navigation system 100 can include the third device 108 of FIG. 1, the network 104 of FIG. 1, and the fourth device 110 of FIG. 1. The third device 108 can send information in a third device transmission 608 of FIG. 6 over the network 104 to the fourth device 110. The fourth device 110 can send information in a fourth device transmission 610 of FIG. 6 over the network 104 to the third device 108.

For illustrative purposes, the navigation system 100 is shown with the third device 108 and the fourth device 110 as client devices, although it is understood that the navigation system 100 can include the third device 108, the fourth device 110, or a combination thereof as a different type of device. For example, the third device 108 can be a server containing a display interface.

Also for illustrative purposes, the navigation system 100 is shown with interaction between the third device 108 and the fourth device 110. However, it is understood that the third device 108 can similarly interact with the first device 102 of FIG. 1, the second device 106 of FIG. 1, or a combination thereof. Similarly, the fourth device 110 can similarly interact with the first device 102, the second device 106, or a combination thereof.

For brevity of description in this embodiment of the present invention, the third device 108 and the fourth device 110 will be described as a client device. The embodiment of the present invention is not limited to this selection for the type of devices. The selection is an example of an embodiment of the present invention.

The third device 108 can include a third control circuit 612 of FIG. 6, a third storage circuit 614 of FIG. 6, a third communication circuit 616 of FIG. 6, and a third user interface 618 of FIG. 6, and a third location circuit 620 of FIG. 6. The third control circuit 612 can include a third control interface 622 of FIG. 6. The third control circuit 612 can execute a third software 626 of FIG. 6 to provide the intelligence of the navigation system 100.

The third control circuit 612 can be implemented in a number of different manners. For example, the third control circuit 612 can be a processor, an application specific integrated circuit (ASIC) an embedded processor, a microprocessor, a hardware control logic, a hardware finite state machine (FSM), a digital signal processor (DSP), or a combination thereof. The third control interface 622 can be used for communication between the third control circuit 612 and other functional units or circuits in the third device 108. The third control interface 622 can also be used for communication that is external to the third device 108.

The third control interface 622 can receive information from the other functional units/circuits or from external sources, or can transmit information to the other functional units/circuits or to external destinations. The external sources and the external destinations refer to sources and destinations external to the third device 108.

The third control interface 622 can be implemented in different ways and can include different implementations depending on which functional units/circuits or external units/circuits are being interfaced with the third control interface 622. For example, the third control interface 622 can be implemented with a pressure sensor, an inertial sensor, a microelectromechanical system (MEMS), optical circuitry, waveguides, wireless circuitry, wireline circuitry, or a combination thereof.

The third storage circuit 614 can store the third software 626. The third storage circuit 614 can also store the relevant information, such as data representing incoming images, data representing previously presented image, sound files, or a combination thereof.

The third storage circuit 614 can be a volatile memory, a nonvolatile memory, an internal memory, an external memory, or a combination thereof. For example, the third storage circuit 614 can be a nonvolatile storage such as non-volatile random access memory (NVRAM), Flash memory, disk storage, or a volatile storage such as static random access memory (SRAM).

The third storage circuit 614 can include a third storage interface 624 of FIG. 6. The third storage interface 624 can be used for communication between the third storage circuit 614 and other functional units or circuits in the third device 108. The third storage interface 624 can also be used for communication that is external to the third device 108.

The third storage interface 624 can receive information from the other functional units/circuits or from external sources, or can transmit information to the other functional units/circuits or to external destinations. The external sources and the external destinations refer to sources and destinations external to the third device 108.

The third storage interface 624 can include different implementations depending on which functional units/circuits or external units/circuits are being interfaced with the third storage circuit 614. The third storage interface 624 can be implemented with technologies and techniques similar to the implementation of the third control interface 622.

The third communication circuit 616 can enable external communication to and from the third device 108. For example, the third communication circuit 616 can permit the third device 108 to communicate with the fourth device 110, an attachment, such as a peripheral device or a desktop computer, and the network 104.

The third communication circuit 616 can also function as a communication hub allowing the third device 108 to function as part of the network 104 and not limited to be an end point or terminal circuit to the network 104. The third communication circuit 616 can include active and passive components, such as microelectronics or an antenna, for interaction with the network 104.

The third communication circuit 616 can include a third communication interface 628 of FIG. 6. The third communication interface 628 can be used for communication between the third communication circuit 616 and other functional units or circuits in the third device 108. The third communication interface 628 can receive information from the other functional units/circuits or can transmit information to the other functional units or circuits.

The third communication interface 628 can include different implementations depending on which functional units or circuits are being interfaced with the third communication circuit 616. The third communication interface 628 can be implemented with technologies and techniques similar to the implementation of the third control interface 622.

The third user interface 618 allows a user (not shown) to interface and interact with the third device 108. The third user interface 618 can include an input device and an output device. Examples of the input device of the third user interface 618 can include a keypad, a touchpad, soft-keys, a keyboard, a microphone, an infrared sensor for receiving remote signals, or any combination thereof to provide data and communication inputs.

The third user interface 618 can include a third display interface 630 of FIG. 6. The third display interface 630 can include an output device. The third display interface 630 can include a display, a projector, a video screen, a speaker, or any combination thereof.

The third control circuit 612 can operate the third user interface 618 to display information generated by the navigation system 100. The third control circuit 612 can also execute the third software 626 for the other functions of the navigation system 100, including receiving location information from the third location circuit 620. The third control circuit 612 can further execute the third software 626 for interaction with the network 104 via the third communication circuit 616.

The third location circuit 620 can generate location information, current heading, current acceleration, and current speed of the third device 108, as examples. The third location circuit 620 can be implemented in many ways. For example, the third location circuit 620 can function as at least a part of the global positioning system, an inertial navigation system, a cellular-tower location system, a pressure location system, or any combination thereof. Also, for example, the third location circuit 620 can utilize components such as an accelerometer or global positioning system (GPS) receiver.

The third location circuit 620 can include a third location interface 632 of FIG. 6. The third location interface 632 can be used for communication between the third location circuit 620 and other functional units or circuits in the third device 108. The third location interface 632 can also be used for communication external to the third device 108.

The third location interface 632 can receive information from the other functional units/circuits or from external sources, or can transmit information to the other functional units/circuits or to external destinations. The external sources and the external destinations refer to sources and destinations external to the third device 108.

The third location interface 632 can include different implementations depending on which functional units/circuits or external units/circuits are being interfaced with the third location circuit 620. The third location interface 632 can be implemented with technologies and techniques similar to the implementation of the third control circuit 612.

The fourth device 110 can include a fourth control circuit 634 of FIG. 6, a fourth communication circuit 636 of FIG. 6, a fourth user interface 638 of FIG. 6, and a fourth storage circuit 646 of FIG. 6. The fourth control circuit 634 can execute a fourth software 642 of FIG. 6 to provide the intelligence of the navigation system 100.

The fourth user interface 638 allows a user (not shown) to interface and interact with the fourth device 110. The fourth user interface 638 can include an input device and an output device. Examples of the input device of the fourth user interface 638 can include a keypad, a touchpad, soft-keys, a keyboard, a microphone, or any combination thereof to provide data and communication inputs. Examples of the output device of the fourth user interface 638 can include a fourth display interface 640 of FIG. 6. The fourth display interface 640 can include a display, a projector, a video screen, a speaker, or any combination thereof.

The fourth control circuit 634 can operate the fourth user interface 638 to display information. The fourth control circuit 634 can also execute the fourth software 642 for the other functions of the navigation system 100, including operating the fourth communication circuit 636 to communicate with the third device 108 over the network 104. The fourth software 642 can operate in conjunction with the third software 626, the first software 526 of FIG. 5, the second software 542 of FIG. 5, or a combination thereof.

The fourth control circuit 634 can be implemented in a number of different manners. For example, the fourth control circuit 634 can be a processor, an embedded processor, a microprocessor, hardware control logic, a hardware finite state machine (FSM), a digital signal processor (DSP), or a combination thereof.

The fourth control circuit 634 can include a fourth control interface 644 of FIG. 6. The fourth control interface 644 can be used for communication between the fourth control circuit 634 and other functional units or circuits in the fourth device 110. The fourth control interface 644 can also be used for communication that is external to the fourth device 110.

The fourth control interface 644 can receive information from the other functional units/circuits or from external sources, or can transmit information to the other functional units/circuits or to external destinations. The external sources and the external destinations refer to sources and destinations external to the fourth device 110.

The fourth control interface 644 can be implemented in different ways and can include different implementations depending on which functional units/circuits or external units/circuits are being interfaced with the fourth control interface 644. For example, the fourth control interface 644 can be implemented with a pressure sensor, an inertial sensor, a microelectromechanical system (MEMS), optical circuitry, waveguides, wireless circuitry, wireline circuitry, or a combination thereof.

A fourth storage circuit 646 can store the fourth software 642. The fourth storage circuit 646 can also store the information such as data representing incoming images, data representing previously presented image, sound files, or a combination thereof.

For illustrative purposes, the fourth storage circuit 646 is shown as a single element, although it is understood that the fourth storage circuit 646 can be a distribution of storage elements. Also for illustrative purposes, the navigation system 100 is shown with the fourth storage circuit 646 as a single hierarchy storage system, although it is understood that the navigation system 100 can include the fourth storage circuit 646 in a different configuration. For example, the fourth storage circuit 646 can be formed with different storage technologies forming a memory hierarchal system including different levels of caching, main memory, rotating media, or off-line storage.

The fourth storage circuit 646 can be a volatile memory, a nonvolatile memory, an internal memory, an external memory, or a combination thereof. For example, the fourth storage circuit 646 can be a nonvolatile storage such as non-volatile random access memory (NVRAM), Flash memory, disk storage, or a volatile storage such as static random access memory (SRAM).

The fourth storage circuit 646 can include a fourth storage interface 648 of FIG. 6. The fourth storage interface 648 can be used for communication between the fourth storage circuit 646 and other functional units or circuits in the fourth device 110. The fourth storage interface 648 can also be used for communication that is external to the fourth device 110.

The fourth storage interface 648 can receive information from the other functional units/circuits or from external sources, or can transmit information to the other functional units/circuits or to external destinations. The external sources and the external destinations refer to sources and destinations external to the fourth device 110.

The fourth storage interface 648 can include different implementations depending on which functional units/circuits or external units/circuits are being interfaced with the fourth storage circuit 646. The fourth storage interface 648 can be implemented with technologies and techniques similar to the implementation of the fourth control interface 644.

The fourth communication circuit 636 can enable external communication to and from the fourth device 110. For example, the fourth communication circuit 636 can permit the fourth device 110 to communicate with the third device 108 over the network 104.

The fourth communication circuit 636 can also function as a communication hub allowing the fourth device 110 to function as part of the network 104 and not limited to be an end point or terminal unit or circuit to the network 104. The fourth communication circuit 636 can include active and passive components, such as microelectronics or an antenna, for interaction with the network 104.

The fourth communication circuit 636 can include a fourth communication interface 650 of FIG. 6. The fourth communication interface 650 can be used for communication between the fourth communication circuit 636 and other functional units or circuits in the fourth device 110. The fourth communication interface 650 can receive information from the other functional units/circuits or can transmit information to the other functional units or circuits.

The fourth communication interface 650 can include different implementations depending on which functional units or circuits are being interfaced with the fourth communication circuit 636. The fourth communication interface 650 can be implemented with technologies and techniques similar to the implementation of the fourth control interface 644.

The third communication circuit 616 can couple with the network 104 to send information to the fourth device 110 in the third device transmission 608. The fourth device 110 can receive information in the fourth communication circuit 636 from the third device transmission 608 of the network 104.

The fourth communication circuit 636 can couple with the network 104 to send information to the third device 108 in the fourth device transmission 610. The third device 108 can receive information in the third communication circuit 616 from the fourth device transmission 610 of the network 104. The navigation system 100 can be executed by the third control circuit 612, the fourth control circuit 634, or a combination thereof.

The first location circuit 520 of FIG. 5 can generate location information, current heading, current acceleration, and current speed of the first device 102, as examples. The first location circuit 520 can be implemented in many ways. For example, the first location circuit 520 can function as at least a part of the global positioning system, an inertial navigation system, a cellular-tower location system, a pressure location system, or any combination thereof. Also, for example, the first location circuit 520 can utilize components such as an accelerometer or global positioning system (GPS) receiver.

The fourth location circuit 652 of FIG. 6 can include a fourth location interface 654 of FIG. 6. The fourth location interface 654 can be used for communication between the fourth location circuit 652 and other functional units or circuits in the first device 102. The fourth location interface 654 can also be used for communication external to the first device 102.

The fourth location interface 654 can receive information from the other functional units/circuits or from external sources, or can transmit information to the other functional units/circuits or to external destinations. The external sources and the external destinations refer to sources and destinations external to the first device 102.

The fourth location interface 654 can include different implementations depending on which functional units/circuits or external units/circuits are being interfaced with the fourth location circuit 652. The fourth location interface 654 can be implemented with technologies and techniques similar to the implementation of the first control circuit 512 of FIG. 5.

For illustrative purposes, the fourth device 110 is shown with the partition containing the fourth user interface 638, the fourth storage circuit 646, the fourth control circuit 634, and the fourth communication circuit 636, although it is understood that the fourth device 110 can include a different partition. For example, the fourth software 642 can be partitioned differently such that some or all of its function can be in the fourth control circuit 634 and the fourth communication circuit 636. Also, the fourth device 110 can include other functional units or circuits not shown in FIG. 6 for clarity.

The functional units or circuits in the third device 108 can work individually and independently of the other functional units or circuits. The third device 108 can work individually and independently from the fourth device 110 and the network 104.

The functional units or circuits in the fourth device 110 can work individually and independently of the other functional units or circuits. The fourth device 110 can work individually and independently from the third device 108 and the network 104.

The functional units or circuits described above can be implemented in hardware. For example, one or more of the functional units or circuits can be implemented using the a gate, circuitry, a processor, a computer, integrated circuit, integrated circuit cores, a pressure sensor, an inertial sensor, a microelectromechanical system (MEMS), a passive device, a physical non-transitory memory medium including instructions for performing the software function, a portion therein, or a combination thereof.

For illustrative purposes, the navigation system 100 is described by operation of the third device 108 and the fourth device 110. It is understood that the third device 108 and the fourth device 110 can operate any of the modules and functions of the navigation system 100.

Figure 7:
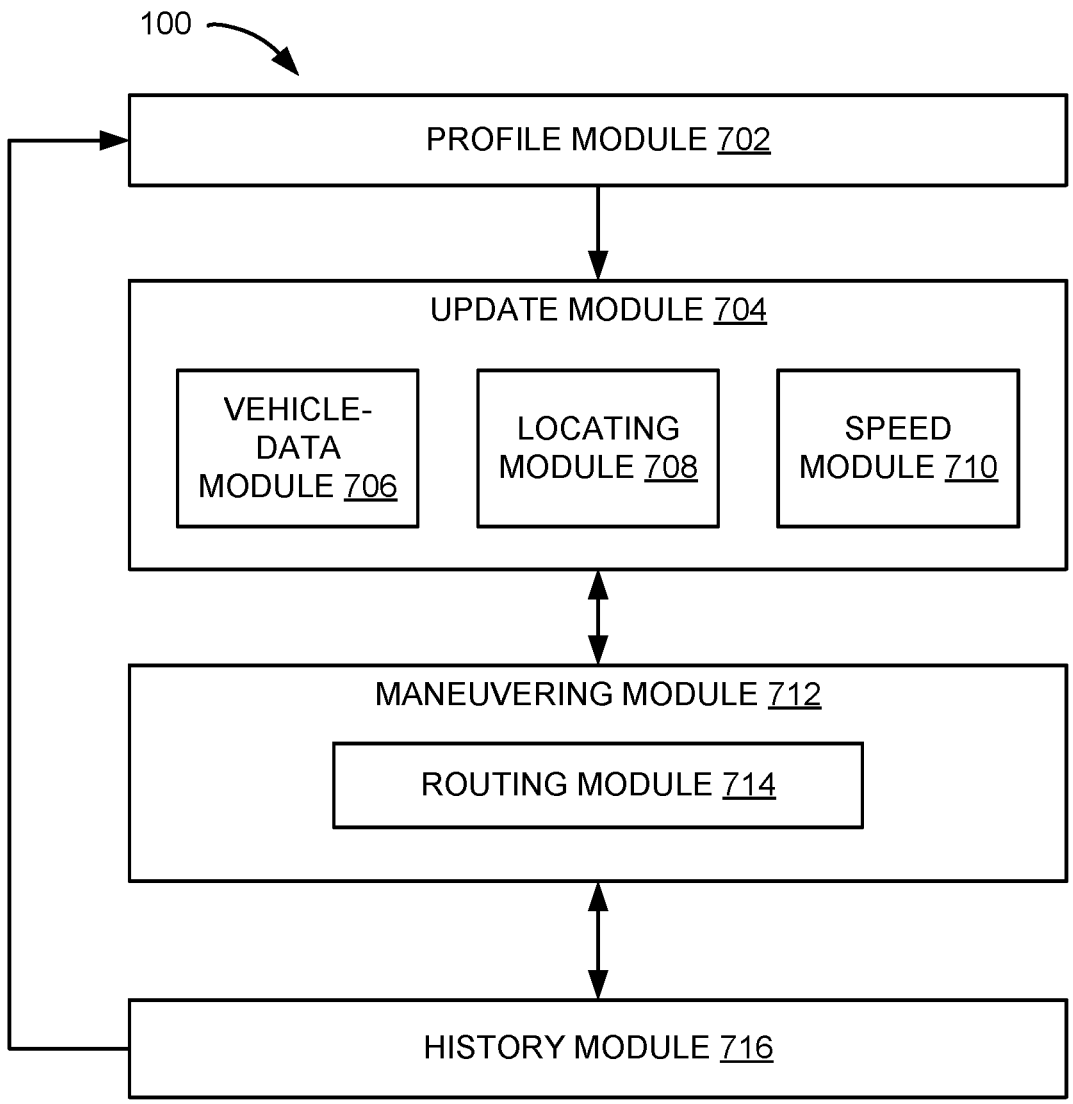
FIG. 7 is a control flow of the navigation system.

Referring now to FIG. 7, therein is shown a control flow of the navigation system 100 of FIG. 1. The navigation system 100 can include a profile module 702, an update module 704, a maneuvering module 712, a history module 716, or a combination thereof.

The profile module 702 can be coupled to the update module 704. The update module 704 can be coupled to the maneuvering module 712. The maneuvering module 712 can be coupled to the history module 716.

The modules can be coupled using wired or wireless connections, by including an output of one module as an input of the other module, by including operations of one module influence operation of the other module, or a combination thereof. The modules can be directly coupled with no intervening structures or objects other than the connector therebetween, or indirectly coupled.

The profile module 702 is configured to manage information regarding one or more users of the navigation system 100. The profile module 702 can manage information by initiating, storing, updating, matching, or a combination thereof for the account information for the user 112 of FIG. 1. The account information can include the vehicle description, pertaining serial number, the user access level, phone number, patterns, history, or any information that identifies the user.

For example, the profile module 702 can interact with the user 112 to create or initialize a user account including user's identification, contact information, preferences, vehicle ownership or usage information, or a combination thereof. As a more specific example, the profile module 702 can identify the user 112 and the identification for a device owned by, operated by, associated with, used by, or a combination thereof for the user 112. Also as a more specific example, the profile module 702 can manage the user's permission level to access the server, a device associated with the user 112, or a combination thereof.

Also for example, the profile module 702 can update or store changes to the user account. Also for example, the profile module 702 can identify and store other processing results discussed below, such as patterns or real-time information for the user 112. As a more specific example, the profile module 702 can record or access historical information such as previous searches requested by the user 112 to the navigation system 100, previously requested routes, previous locations of the user 112 or a device associated thereto, or a combination thereof.

The profile module 702 can receive or detect information regarding the user 112 using one or more user interfaces of one or more devices, such as the first user interface 518 of FIG. 5, the second user interface 538 of FIG. 5, the third user interface 618 of FIG. 6, the fourth user interface 638 of FIG. 6, the vehicle user interface, or a combination thereof. The profile module 702 can further receive or detect information regarding the user 112 using one or more communication circuits, such as the first communication circuit 516 of FIG. 5, the second communication circuit 536 of FIG. 5, the third communication circuit 616 of FIG. 6, the fourth communication circuit 636 of FIG. 6, the vehicle communication circuit 204 of FIG. 2, or a combination thereof. The profile module 702 can further receive or detect information regarding the user 112 using one or more location circuits, such as the first location circuit 520 of FIG. 5, the third location circuit 620 of FIG. 6, the fourth location circuit 652 of FIG. 6, or a combination thereof.

The profile module 702 can manage the received or detected information using one or more control circuits, such as the first control circuit 512 of FIG. 5, the second control circuit 534 of FIG. 5, the third control circuit 612 of FIG. 6, the fourth control circuit 634 of FIG. 6, the vehicle control circuit 206 of FIG. 2, or a combination thereof. The profile module 702 can store the user account information, in one or more storage circuits, such as the first storage circuit 514 of FIG. 5, the second storage circuit 546 of FIG. 5, the third storage circuit 614 of FIG. 6, the fourth storage circuit 646 of FIG. 6, the vehicle storage circuit 208 of FIG. 2, or a combination thereof.

After managing the information regarding one or more end users, the control flow can pass from the profile module 702 to the update module 704. For example, the control flow can pass by containing a processing result, such as the user account information as an output from the profile module 702 to an input of the update module 704.

Also for example, the control flow can further pass by storing the processing result at a location known and accessible to the update module 704. Also for example, the control flow can further pass by notifying the update module 704, such as by using a flag, an interrupt, a status signal, or a combination thereof. Also for example, the control flow can further pass using a combination of the processes described above.

The update module 704 is configured to identify or determine real-time information regarding one or more users. The update module 704 can identify or determine the real-time information, such as location of the user 112, a location of one or more devices or vehicles associated with the user 112, other sensed or detected information from the one or more devices or vehicles associated with the user 112, or a combination thereof. The update module 704 can determine the area profile 306 of FIG. 3, the current driving profile 402 of FIG. 4, or a combination thereof.

For example, the update module 704 can identify or determine the current location 302 of FIG. 3, the travel-lane identification 230 of FIG. 2, the current speed 412, or a combination thereof for one or more devices or vehicles. The navigation system 100 can locate and track movements of the first device 102 of FIG. 1, the second device 106 of FIG. 1, the third device 108 of FIG. 1, the fourth device 110 of FIG. 1, the smart vehicle 222 of FIG. 2, the control vehicle 202 of FIG. 2, or a combination thereof.

Also for example, the update module 704 can determine sensory or status information of the device associated with the user 112. As a more specific example, the update module 704 can determine sensory or status information of the first device 102, the third device 108, the fourth device 110, or a combination thereof. Also as a more specific example, the update module 704 can determine and process the vehicle data 220 of FIG. 2. The update module 704 can identify or determine real-time information using a vehicle-data module 706, a locating module 708, a speed module 710, or a combination thereof.

The vehicle-data module 706 is configured to determine and manage the vehicle data 220. The vehicle-data module 706 can determine the vehicle data 220 from the environmental sensors 210 of FIG. 2 of the smart vehicle 222, from one or more of the devices, or a combination thereof.

The vehicle-data module 706 can determine the vehicle data 220 by processing the environmental sensors 210 of a vehicle built or integrated within the smart vehicle 222. The vehicle-data module 706 can also receive and process the vehicle data 220 at the server or the service provider as illustrated by the second device 106, at another instance of the smart vehicle 222 or the user device as illustrated by the first device 102 or the third device 108.

For example, the vehicle-data module 706 can implement or utilize the environmental sensors 210 to obtain various information including the vehicle data 220 from the first device 102, the fourth device 110, the smart vehicle 222, the control vehicle 202, or a combination thereof. The environmental sensors 210 can provide information about the first device 102, the third device 108, the fourth device 110, the smart vehicle 222, the unintelligent vehicle 224, the control vehicle 202, an area or a situation surrounding the corresponding device, or a combination thereof.

The vehicle-data module 706 can implement or facilitate direct communication of the vehicle data 220 or other information associated with the vehicle or location directly between vehicles or user devices. The vehicle-data module 706 can further implement or facilitate communication of the vehicle data 220 or other information through the server or the service provider.

The vehicle-data module 706 can receive and store the vehicle data 220 self-reporting information regarding position, status, speed or movement, settings, routes, or a combination thereof associated with or relevant to the reporting device or vehicle. The vehicle-data module 706 can further receive and store the vehicle data 220 reporting information regarding the surrounding or environment of the reporting device or vehicle, such as sensor information.

The update module 704 can utilize the vehicle data 220 to generate and update the area profile 306, the current driving profile 402 for each of the vehicles or devices, or a combination thereof. For example, the update module 704 can use the locating module 708 and the speed module 710 to determine and monitor the locations and movements of the various vehicles or devices.

The locating module 708 is configured to identify the current location 302 of the user 112, device or vehicles corresponding to the user 112, or a combination thereof. The locating module 708 can identify the current location 302 based on locating or identifying the information from the self-reporting instance of the vehicle data 220, such as for coordinates, addresses, information from location circuit of the corresponding device, or other location identifiers. The locating module 708 can further calculate the current location 302 for other non-reporting vehicles based on information corresponding to the environmental sensors 210.

The locating module 708 can identify the current location of a user device corresponding to a specific vehicle, including a particular instance of the unintelligent vehicle 224 of FIG. 2 or the smart vehicle 222. For example, the locating module 708 can identify the location for the cell phone of the user 112 driving or occupying the unintelligent vehicle 224. Also for example, the locating module 708 can identify the location from the cell phone of the user 112 driving or occupying the smart vehicle 222 instead of or in addition to location information directly from the smart vehicle 222.

The locating module 708 can match the current location 302 to the specific cars using the output of the profile module 702, such as the user account information. For example, the locating module 708 can use the user account information to match the current information to a type of vehicle or a specific vehicle identification.

The locating module 708 can further locate the vehicles or devices not reporting the vehicle data 220, such as for the unintelligent vehicle 224. The current location 302 for such vehicles can be determined based identifying such vehicles within or from the vehicle data 220 and then analyzing the vehicle data 220 for distance or relative positional information. The locating module 708 can calculate the current location 302 of the non-reporting vehicles based on combining the distance or the relative positional information with the current location 302 of the device or the vehicle providing the vehicle data 220 including the non-reporting vehicle.

For example, from the environmental sensor information, the locating module 708 can identify a vehicle that is unknown or unaccounted for based on the self-reporting identification and location from instances of the vehicle data 220. The locating module 708 can utilize the video data to recognize a vehicle, and the relative location of the previously unknown vehicle to the reporting vehicle. The locating module 708 can estimate or calculate the distance based on the video data, signal strength, radar reading, or a combination thereof sensing the previously unknown vehicle. The locating module 708 can further process the vehicle data 220 from multiple vehicles surrounding or sensing the previously unknown vehicle to calculate the current location 302.

The locating module 708 can further calculate the travel-lane identification 230 for one or more vehicles for the area profile 306. The locating module 708 can calculate the travel-lane identification 230 in a variety of ways.

For example, the locating module 708 can utilize the current location 302 with accuracy and granularity sufficient to identify the traffic lane 232 of FIG. 2 occupied or traversed by the corresponding vehicle. Also for example, the locating module 708 can utilize dead-reckoning mechanism with acceleration, speed, and corresponding time information to locate the corresponding vehicle to the specific instance of the traffic lane 232. Also for example, the locating module 708 can utilize vehicle's lane sensor information or a sequence and a timing of accelerations, such as for magnitude and direction, to track lane-changes and subsequently calculate the travel-lane identification 230.

Also for example, the locating module 708 can utilize other identifying markers or signals, such as for roadside devices, lane identifying markers, cameras, or a combination thereof. Also for example, the locating module 708 can analyze video or image information based on known location markers, vehicle arrangements, or a combination thereof to calculate the travel-lane identification 230 of the reporting vehicle.

The locating module 708 can further determine the lane-level relationship 308 between vehicles for the area profile 306. The locating module 708 can determine the lane-level relationship 308 based on the travel-lane identification 230 corresponding to each of the vehicles. For example, the locating module 708 can determine the vehicles as traveling in the same lane, in adjacent lanes, or a combination thereof.

The speed module 710 is configured to calculate the current speed 412 of the vehicles. The speed module 710 can calculate the current speed 412 similar to process for the current location 302 as discussed above.

For example, the speed module 710 can calculate the current speed 412 based on the self-reporting data within the vehicle data 220. The speed module 710 can further calculate the current speed 412 based on a difference or a change in an observed vehicle or landmark in one or more data points and the corresponding time associated with the one or more data points.

The speed module 710 can calculate the speed for the traffic lane 232 or a location or segment therein. The speed module 710 calculate the speed for the traffic lane 232 based on averaging the current speed 412 for one or more vehicles within the traffic lane 232, vehicles over a period of time, or a combination thereof.

The speed module 710 can further calculate the speed for the traffic lane 232 within or outside of the reaction threshold 320 of FIG. 3 relative to the control vehicle 202. The speed module 710 can use the speed for the traffic lane 232 to determine the adjacent lane speed 314 of FIG. 3 for the adjacent lane 234 of FIG. 2 relative to the control vehicle 202.

The update module 704 can further use the vehicle data 220 to identify, locate, process, or a combination thereof for other events, circumstances, context, or a combination thereof in real-time for the area profile 306. For example, the update module 704 can use the vehicle data 220 to determine the adjacent lane status 310 of FIG. 3, the impeding source location 312 of FIG. 3, the traffic condition 316 of FIG. 3, events, conditions, accidents, or a combination thereof for the area profile 306.

As a more specific example, the update module 704 can analyze the vehicle data 220 and deduce the weather or visibility conditions from the accessory status 226 of FIG. 2, the video or image data, or a combination thereof. Also as a more specific example, the update module 704 can utilize image analysis and recognition to identify road hazards, accidents, stalled vehicles, blinking hazard lights, a location thereof, or a combination thereof.

The update module 704 can further utilize information from other database or services. For example, the update module 704 can determine the weather or visibility information based on a weather service. Also for example, the update module 704 can identify events, constructions, or a combination thereof based on accessing other corresponding databases.

The update module 704 can utilize the various data discussed above, the vehicle data 220, or a combination thereof to determine the adjacent lane status 310. For example, the update module 704 can utilize the various processing data or the vehicle data 220 according to the traffic lane 232 as an input for recognizing matching instance of the category, the label, the case, the value, events or conditions, or a combination thereof. The update module 704 can similarly determine the traffic condition 316, the traffic light schedule 422 of FIG. 4, the road-external schedule 424 of FIG. 4, or a combination thereof for an area, for one or more traffic lanes, or a combination thereof.

The update module 704 can further calculate, adjust, estimate or predict for a future time, or a combination thereof for the traffic lane speed based on the other events, circumstances, context, or a combination thereof. For example, the update module 704 can calculate or update a change in the speed or a pattern thereof for various lanes based on or in response to an accident, a sporting event status, weather or visibility, or a combination thereof.

For illustrative example, an accident on a road can cause back-ups and delays turn lanes for maneuvering into the road with the accident. The delays on the turn lanes can subsequently affect the traffic flow of other lanes, which can further have impact on other connecting or related roads. The update module 704 can calculate or predict the pattern and the changes in speeds specific to each traffic lane based on system logic, machine learned or determined patterns, historical data, or a combination thereof.

The update module 704 can identify, determine, further process or match, or a combination thereof for the real-time information using one or more control circuits as discussed above. The update module 704 can store the real-time information, such as the area profile 306 including the current location 302, the current speed 412 of FIG. 4, the travel-lane identification 230, the vehicle data 220, or a combination thereof in one or more storage circuits as discussed above. The update module 704 can further communicate or exchange various information between devices using one or more communications circuits as discussed above.

After identifying or determining the real-time information, the control flow can pass from the update module 704 to the maneuvering module 712. The control flow can pass similarly as described above between the profile module 702 and the update module 704, but using processing results of the update module 704, such as the area profile 306, the vehicle data 220, a portion therein, or a combination thereof.

The maneuvering module 712 is configured to generate information, control signal, or a combination thereof based on the area profile 306. The maneuvering module 712 can generate information, control signal, or a combination thereof for implementation or communication at one or more devices or vehicles.

For example, the maneuvering module 712 can calculate and generate the lane-level navigation route 322 of FIG. 3 optimizing the travel time 324 of FIG. 3, the travel risk 326 of FIG. 3, or a combination thereof. Also for example, the maneuvering module 712 can calculate and generate the routing adjustment 406 of FIG. 4. Also for example, the maneuvering module 712 can generate the vehicle movement control 228 of FIG. 2, the control vehicle speed 404 of FIG. 4, the vehicle control 408 of FIG. 4, or a combination thereof.

The maneuvering module 712 can generate the vehicle movement control 228 representing control signals or suggestions for the current driving profile 402 based on the area profile 306. The maneuvering module 712 can generate the control signals or suggestions for physically maneuvering the control vehicle 202 based on the current movement of one or more vehicles, the relative relationship or locations between vehicles, or a combination thereof.

The maneuvering module 712 can further generate the vehicle movement control 228 based on and specific to the traffic lane 232 of the control vehicle 202. The maneuvering module 712 can generate the vehicle movement control 228, such as including the control vehicle speed 404, the vehicle control 408, the routing adjustment 406, or a combination thereof, based on or using the travel-lane identification 230, other lane-specific information discussed above, or a combination thereof.

The maneuvering module 712 can use the lane-specific information separate from, independent of, along with, or a combination thereof relative to the vehicle data 220 from the environmental sensors 210 of the control vehicle 202. For example, the maneuvering module 712 can implement smart-cruise control or self-driving feature using the lane specific information separate from or to assist processing of the real-time information regarding cars or obstacles surrounding the control vehicle 202.

The maneuvering module 712 can generate the vehicle movement control 228 based on the travel-lane identification 230 for controlling a physical operation or function of the control vehicle 202. The maneuvering module 712 can generate the vehicle movement control 228 including the control vehicle speed 404 for dynamically or statically controlling a speed of the control vehicle 202 traveling in the traffic lane 232 according to the travel-lane identification 230.

For example, the maneuvering module 712 can calculate the control vehicle speed 404 to be the same as the lane speed or flow rate of the traffic lane 232 corresponding to the travel-lane identification 230 at the current location 302 of the control vehicle 202. The maneuvering module 712 can set the control vehicle speed 404 to match the speed of the traffic lane 232 occupied or traversed by the control vehicle 202.

Also for example, the maneuvering module 712 can calculate or adjust the control vehicle speed 404, generate the routing adjustment 406, the vehicle control 408, a potential instance thereof, or a combination thereof based on the adjacent lane speed 314. The maneuvering module 712 can use the adjacent lane speed 314 calculated as discussed above for representing a real-time speed of vehicles in the adjacent lane 234.

Continuing with the example, the maneuvering module 712 can generate the routing adjustment 406, the vehicle control 408, a potential instance thereof, or a combination thereof based on comparing the adjacent lane speed 314 and the current speed 412 of the control vehicle 202. The maneuvering module 712 can generate the routing adjustment 406, the vehicle movement control 228, a potential instance thereof, or a combination thereof based on difference between the two being greater than a threshold predetermined by the navigation system 100.

Continuing with the example, the maneuvering module 712 can generate the routing adjustment 406, the vehicle control 408, a potential instance thereof, or a combination thereof for anticipating vehicles changing lanes and accounting for the difference in speeds. The maneuvering module 712 can slow down or reduce the speed for the control vehicle speed 404, increase a separation distance with a vehicle in front for the routing adjustment 406 or the vehicle control 408, prepare or implement evasive maneuvers for the vehicle movement control 228, or a combination thereof.

As a more specific example, the maneuvering module 712 can calculate or adjust the reaction threshold 320 based on the area profile 306, the current speed 412 of the control vehicle 202, the adjacent lane speed 314, the lane-specific history 318 of FIG. 3, or a combination thereof. The maneuvering module 712 can calculate or adjust the reaction threshold 320 dynamically in real-time for representing a limit in physical separation between the control vehicle 202 in the traffic lane 232 and a vehicle, an object, a situation or a condition, or a combination thereof representing the impeding source location 312 in the adjacent lane 234 or the same lane.

Continuing with the specific example, the maneuvering module 712 can generate the vehicle movement control 228 based on comparing the lane-level relationship 308 of FIG. 3 and the reaction threshold 320. The maneuvering module 712 can determine the reaction-worthy deceleration status 410 of FIG. 4 based on comparing the lane-level relationship 308 and the reaction threshold 320.

The maneuvering module 712 can generate the vehicle movement control 228 when the lane-level relationship 308 indicates that another vehicle is within the reaction threshold 320 according to the reaction-worthy deceleration status 410 and matching another condition, such as an event or a condition affecting the flow of traffic, sufficient difference in speeds, or a combination thereof. The maneuvering module 712 can generate the vehicle movement control 228 for anticipating movement of a further vehicle from the adjacent lane 234 into the traffic lane 232.

For further example, the maneuvering module 712 can generate the vehicle movement control 228 based on the accessory status 226 of the control vehicle 202, other vehicles, or a combination thereof. The maneuvering module 712 can generate the vehicle movement control 228 accounting for driving conditions, such as road condition, weather condition, visibility, or a combination thereof according to the accessory status 226. For example, the maneuvering module 712 can decrease the speed for the control vehicle speed 404 or increase the following distance for the vehicle movement control 228 based on detecting active wiper status, active headlight status, heater setting, or a combination thereof.

Also for example, the maneuvering module 712 can generate the vehicle movement control 228 based on the lane-specific history 318 associated with or at the current location 302 and the travel-lane identification 230 for the control vehicle 202. The maneuvering module 712 can match the control vehicle speed 404 to the lane speed according to the lane-specific history 318 of the traffic lane 232.

The maneuvering module 712 can further include a routing module 714 configured to calculate the lane-level navigation route 322. The maneuvering module 712 can calculate the lane-level navigation route 322 for recommending or maneuvering the control vehicle 202 to travel in specific instances of the traffic lane 232 to minimize or optimize the travel time 324, the travel risk 326, or a combination thereof.

Various road segments can have lanes that travel faster, that experience less hazards or accidents, or a combination thereof in comparison to other lanes. The disparities can be based on specifics or designs of the road, the entities or context surrounding the road, drivers or vehicles frequenting the road, or a combination thereof.

The routing module 714 can identify fastest lanes within a segment of the road based on the speed calculation for specific lanes, real-time speed, current speed ahead in the route, records thereof, or a combination thereof. The routing module 714 can further identify safest lanes based on statistical analysis of the impeding source location 312 being located in each of the lanes. The routing module 714 can calculate the travel time 324 corresponding to the travel speed of the lanes. The routing module 714 can further calculate the travel risk 326 based on the statistical analysis of the impeding source location 312.

The routing module 714 can calculate the lane-level navigation route 322 optimizing or minimizing the travel risk 326, optimizing or minimizing the travel time 324, or a combination thereof based on selecting specific travel lanes along with travel segments. The routing module 714 can calculate the lane-level navigation route 322 based on using or treating each lanes as separate segments, or sub divisions within segments, or a combination thereof.

The maneuvering module 712 can generate the vehicle movement control 228, the lane-level navigation route 322, or a combination thereof using one or more control circuits as discussed above. The maneuvering module 712 can store the vehicle movement control 228, the lane-level navigation route 322, or a combination thereof in one or more storage circuits as discussed above. The maneuvering module 712 can further communicate or exchange various information between devices using one or more communications circuits as discussed above.

After generating and providing direction, control, navigation by the maneuvering module 712, the control flow can pass from the maneuvering module 712 to the history module 716, the update module 704, or a combination thereof. The new maneuver, direction, adjustment, travel, navigation, control, or a combination thereof can pass to the update module 704.

The control flow can also pass from the maneuvering module 712 back to the update module 704. The update module 704 can use the vehicle movement control 228, the lane-level navigation route 322, or a combination thereof to update the area profile 306.

The history module 716 is configured to generate, store, update, or a combination thereof for the lane-specific history 318. The history module 716 can process the lane-specific history 318 based on speed or flow rate for each of the traffic lanes, the impeding source location 312, other lane-specific data, or a combination thereof.

The history module 716 can further process the lane-specific history 318 based on previous instances of the control vehicle speed 404 or the current speed 412 of the control vehicle 202 according to the travel-lane identification 230. The history module 716 can process the lane-specific history 318 for representing a historical record specific to the traffic lane 232.

The history module 716 can generate, identify or parse information, update, or a combination thereof for the lane-specific history 318 using one or more of the control circuits discussed above. The history module 716 can further store the lane-specific history 318 in one or more of the storage circuits discussed above.

The lane-specific information, the user's choices or reactions associated thereto, routing or trace information at lane-level, or a combination thereof can be passed back to the profile module 702. The profile module 702 can update the user information based on updating history information for the user with the passed information.

It has been discovered that generating the vehicle movement control 228 based on the travel-lane identification 230 provides increased safety and usability. The navigation system 100 can use the travel-lane identification 230 to access lane-specific data, such as for cars and situations ahead or in adjacent lane of the control vehicle 202. The lane-specific data and processing can increase accuracy in predicting behaviors of other vehicles, which is factored into generating the vehicle movement control 228 as discussed above. The increased accuracy can provide appropriate maneuvers or movements of the control vehicle 202 to provide the increased safety and usability.

It has further been discovered that generating the vehicle movement control 228 based on the area profile 306 utilizing the vehicle data 220 from one or more instances of the smart vehicle 222 can provide increased processing efficiency. The processing burden can be shared between the control vehicle 202 and the server or other vehicles in mapping and tracking real-time movements and locations of vehicles or objects. Leveraging the area profile 306, the autonomous vehicles can rely on information other than or in addition to information from the environmental sensors 210 therein, which can provide the increase in processing efficiency.

It has further been discovered that the control vehicle speed 404 based on the travel-lane identification 230 provides enhancements for smart cruise control feature. The navigation system 100 can set and adjust the traveling speed of the control vehicle 202 based on information beyond the vehicle or object in front, or absence thereof by taking into account current behaviors and situations of the same and adjacent lanes, the navigation system 100. The additional processing can lead to smoother rides with gradual changes in speed to increase comfort of the passengers therein.

It has further been discovered that the lane-level navigation route 322 provides reduced travel time and accident risks while lowering fuel consumption. The lane-level navigation route 322 can leverage information for specific lanes, such as speeds and average rate of accidents for certain lanes at specific locations. The navigation system 100 can use the lane-level information as a factor to calculate fastest, safest, or a combination thereof for a sequence of lanes. The sequence of lanes can further reduce frequency and magnitude of decelerations and accelerations, which can further improve fuel consumption.

The modules described in this application can be hardware implementation or hardware accelerators, including passive circuitry, active circuitry, or both, in the first storage circuit 514, the second storage circuit 546, the first control circuit 512, the second control circuit 534, or a combination thereof. The modules can also be hardware implementation or hardware accelerators, including passive circuitry, active circuitry, or both, within the first device 102, the second device 106, the third device 108, the fourth device 110, or a combination thereof but outside of the first storage circuit 514, the second storage circuit 546, the first control circuit 512, the second control circuit 534, or a combination thereof.

The navigation system 100 has been described with module functions or order as an example. The navigation system 100 can partition the modules differently or order the modules differently. For example, the navigation system 100 can include the maneuvering module 712 within or combined with the maneuvering module 712. Also for example, the update module 704 can be implemented in parallel with the profile module 702.

For illustrative purposes, the various modules have been described as being specific to the first device 102, the second device 106, the third device 108, or the fourth device 110. However, it is understood that the modules can be distributed differently. For example, the various modules can be implemented in a different device, or the functionalities of the modules can be distributed across multiple devices. Also as an example, the various modules can be stored in a non-transitory memory medium.

As a more specific example, one or more modules described above can be stored in the non-transitory memory medium for distribution to a different system, a different device, a different user, or a combination thereof, for manufacturing, or a combination thereof. Also as a more specific example, the modules described above can be implemented or stored using a single hardware unit or circuit, such as a chip or a processor, or across multiple hardware units or circuits.

The modules described in this application can be stored in the non-transitory computer readable medium. The first storage circuit 514, the second storage circuit 546, or a combination thereof can represent the non-transitory computer readable medium. The first storage circuit 514, the second storage circuit 546, or a combination thereof, or a portion therein can be removable from the first device 102, the second device 106, the third device 108, the fourth device 110, or a combination thereof. Examples of the non-transitory computer readable medium can be a non-volatile memory card or stick, an external hard disk drive, a tape cassette, or an optical disk.

The physical transformation of the vehicle data 220 representing the real-world environment results in the real-time movement in the physical world, such as physical change in information or environment processed for the user on one or more of the devices or physical displacement of the first device 102 or the control vehicle 202 as a result of implementing the vehicle movement control 228. Movement in the physical world results in updates to the area profile 306, which can be fed back into the navigation system 100 and further influence or update the first device 102, the control vehicle 202, or a combination thereof.

Figure 8:
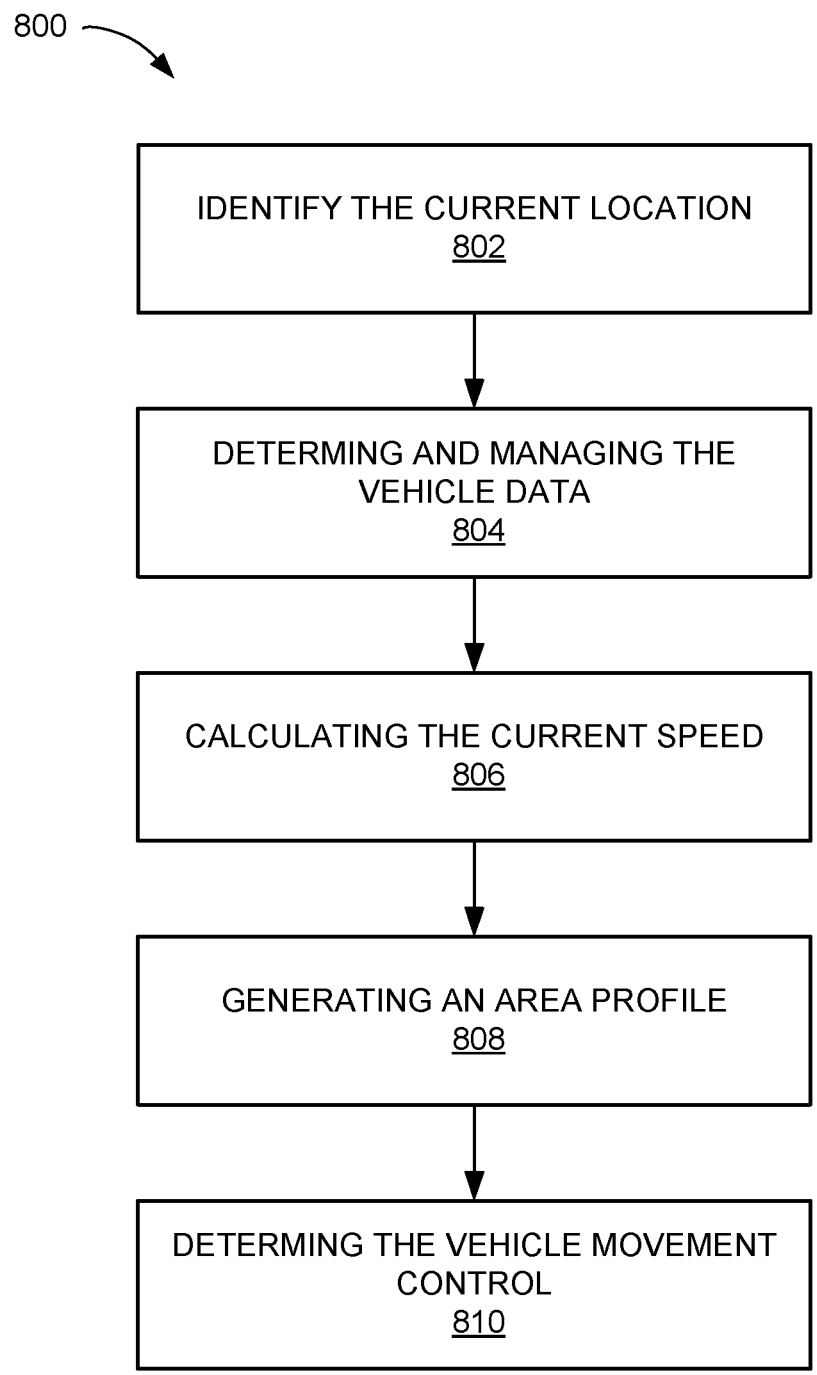
FIG. 8 is a flow chart of a method of operation of a navigation system in an embodiment of the present invention.

Referring now to FIG. 8, therein is shown a flow chart of a method 800 of operation of a navigation system 100 of FIG. 1 in an embodiment of the present invention. The method 800 includes: identifying the current location of the user or the first device in box 802; determining and managing the vehicle data received from the control vehicle, the smart vehicle, the network, or a combination thereof in a box 804; calculating the current speed of all the vehicles in a box 806; generating with a control circuit an area profile for the control vehicle based on the vehicle data, the lane-specific history, traffic flow, or a combination thereof in a box 808, and determining the vehicle movement control for the control vehicle in box 810.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A navigation system comprising:
   a control circuit configured to:
   calculate a current location for representing a control vehicle traveling in a traffic lane, includes the control vehicle performs maneuvers automatically,
   calculate a travel-lane identification for identifying the traffic lane,
   generate a vehicle movement control based on the travel-lane identification for controlling a physical operation or function of the control vehicle, a lane-specific history associated with the current location based on previous instances of a control vehicle speed according to the travel-lane identification for representing a historical record specific to the traffic lane, and a location of a second vehicle, relative to the control vehicle, determined based on a cell phone located in the second vehicle,
   adjust the vehicle movement control based on an estimate or a prediction of a traffic condition,
   provide the vehicle movement control to the second vehicle for maneuvering or operating the second vehicle includes the second vehicle is a self-driving vehicle communicating with the control vehicle to transfer the vehicle movement control through the cell phone; and
   a storage circuit, coupled to the control circuit, configured to:
   store the vehicle movement control, and
   store the lane-specific history.

2. The system as claimed in claim 1 wherein the control circuit is configured to:
   determine an area profile based on vehicle data; wherein:
   the vehicle data is for representing information from a device or the control vehicle including a smart vehicle;
   the area profile is for representing a current state of an area including the current location; and
   generate the vehicle movement control according to the area profile.

3. The system as claimed in claim 1 wherein the control circuit is configured to generate the vehicle movement control including the control vehicle speed for controlling a speed of the control vehicle traveling in the traffic lane according to the travel-lane identification.

4. The system as claimed in claim 1 wherein the control circuit is configured to generate the vehicle movement control further based on an accessory status for representing the control vehicle, a first device, or a combination thereof.

5. The system as claimed in claim 1 wherein the control circuit is configured to calculate a lane-level navigation route for recommending a travel in specific instances of the traffic lane throughout the navigation route to minimize a travel time or a travel risk.

6. The system as claimed in claim 1 wherein the control circuit is configured to:
   determine an area profile based on vehicle data; wherein:
   the vehicle data is for representing real-time information from a device or the control vehicle in a geographic area,
   the area profile is for representing a current state of the geographic area including the current location; and
   generate the vehicle movement control including the control vehicle speed for dynamically controlling a speed of the control vehicle traveling in the traffic lane according to the travel-lane identification.

7. The system as claimed in claim 6 wherein the control circuit is configured to:
   dynamically calculate a reaction threshold for representing a limit in a physical separation between the control vehicle and an impeding source location both in the traffic lane;
   generate the vehicle movement control based on the lane-level relationship and the reaction threshold.

8. The system as claimed in claim 6 wherein the control circuit is configured to:
   dynamically calculate a reaction threshold based on the area profile for representing a limit in physical separation between the control vehicle in the traffic lane and an impeding source location in an adjacent lane; and
   generate the vehicle movement control based on the lane-level relationship for anticipating a movement of a further vehicle from the adjacent lane into the traffic lane.

9. The system as claimed in claim 6 wherein the control circuit is configured to:
   calculate an adjacent lane speed based on the area profile for representing a real-time speed of vehicles in an adjacent lane; and
   generate the vehicle movement control based on the adjacent lane speed.

10. A method of operation for a navigation system comprising:
   calculating a current location for representing a control vehicle traveling in a traffic lane, including the control vehicle performing maneuvers automatically;
   calculating a travel-lane identification for identifying the traffic lane;
   generating with a vehicle movement control based on the travel-lane identification for controlling a physical operation or function of the control vehicle, a lane-specific history associated with the current location based on previous instances of a control vehicle speed according to the travel-lane identification for representing a historical record specific to the traffic lane, and a location of a second vehicle, relative to the control vehicle, determined based on a cell phone located in the second vehicle;
   adjusting the vehicle movement control based on an estimate or a prediction of a traffic condition; and
   providing the vehicle movement control to the second vehicle for maneuvering or operating the second vehicle, includes the second vehicle is a self-driving vehicle communication with the control vehicle for transferring the vehicle movement control through the cell phone.

11. The method as claimed in claim 10 further compromising:
determining an area profile based on vehicle data; wherein:
the vehicle data is representing information from a device or the control vehicle including a smart vehicle;
the area profile is representing a current state of an area including the current location; and
generating the vehicle movement control according to the area profile.

12. The method as claimed in claim 10 wherein generating the vehicle movement control including the control vehicle speed for controlling a speed of the control vehicle traveling in the traffic lane according to the travel-lane identification.

13. The method as claimed in claim 10 further comprising generating the vehicle movement control based on an accessory status for representing the control vehicle, a first device, or a combination thereof.

14. The method as claimed in claim 10 further comprising calculating a lane-level navigation route for recommending a travel in specific instances of the traffic lane throughout the navigation route to minimize travel time or a travel risk.

15. A non-transitory computer readable medium including instructions for a navigation system comprising:
calculating a current location for representing a control vehicle traveling in a traffic lane, including the control vehicle performing maneuvers automatically;
calculating a travel-lane identification for identifying the traffic lane;
generating with a vehicle movement control based on the travel-lane identification for controlling a physical operation or function of the control vehicle, a lane-specific history associated with the current location based on previous instances of a control vehicle speed according to the travel-lane identification for representing a historical record specific to the traffic lane, and a location of a second vehicle, relative to the control vehicle, determined based on a cell phone located in the second vehicle;
adjusting the vehicle movement control based on an estimate or a prediction of a traffic condition; and
providing the vehicle movement control to the second vehicle for maneuvering or operating the second vehicle, includes the second vehicle is a self-driving vehicle communicating with the control vehicle for transferring the vehicle movement control through the cell phone.

16. The non-transitory computer readable medium including the instructions as claimed in claim 15 wherein:
determining an area profile based on vehicle data, wherein:
the vehicle data is representing information from a device or the control vehicle including a smart vehicle;
the area profile is representing a current state of an area including the current location; and
generating the vehicle movement control according to the area profile.

17. The non-transitory computer readable medium including the instructions as claimed in claim 15 wherein generating the vehicle movement control including the control vehicle speed for controlling a speed of the control vehicle traveling in the traffic lane according to the travel-lane identification.

18. The non-transitory computer readable medium including the instructions as claimed in claim 15 further comprising generating the vehicle movement control further based on an accessory status for representing the control vehicle, a first device, or a combination thereof.

19. The non-transitory computer readable medium including the instructions as claimed in claim 15 further comprising calculating a lane-level navigation route for recommending travel in specific instances of the traffic lane throughout the navigation route to minimize travel time or a travel risk.

* * * * *